United States Patent
Kim

(10) Patent No.: US 10,635,788 B2
(45) Date of Patent: Apr. 28, 2020

(54) METHOD FOR TRAINING AND TESTING OBFUSCATION NETWORK CAPABLE OF PROCESSING DATA TO BE CONCEALED FOR PRIVACY, AND TRAINING DEVICE AND TESTING DEVICE USING THE SAME

(71) Applicant: Deeping Source Inc., Seoul (KR)

(72) Inventor: Tae Hoon Kim, Seoul (KR)

(73) Assignee: DEEPING SOURCE INC., Seoul (KR)

( * ) Notice: Subject to any disclaimer, the term of this patent is extended or adjusted under 35 U.S.C. 154(b) by 0 days.

(21) Appl. No.: 16/513,725

(22) Filed: Jul. 17, 2019

(65) Prior Publication Data

US 2020/0034520 A1   Jan. 30, 2020

(30) Foreign Application Priority Data

Jul. 26, 2018 (KR) .......................... 10-2018-0086929

(51) Int. Cl.
  *G06F 21/14* (2013.01)
  *G06K 9/62* (2006.01)
  (Continued)

(52) U.S. Cl.
  CPC .......... *G06F 21/14* (2013.01); *G06F 21/6245* (2013.01); *G06K 9/6256* (2013.01); *G06N 3/04* (2013.01)

(58) Field of Classification Search
  CPC combination set(s) only.
  See application file for complete search history.

(56) References Cited

U.S. PATENT DOCUMENTS

| 2006/0269098 A1 | 11/2006 | Ebitani |
| 2015/0170002 A1* | 6/2015 | Szegedy .................. G06K 9/66 382/156 |

(Continued)

FOREIGN PATENT DOCUMENTS

| JP | 2016-106216 A | 7/2018 |
| KR | 10-2017-0092631 A | 8/2017 |
| KR | 10-1861520 B1 | 5/2018 |

OTHER PUBLICATIONS

McPherson, Richard and Shokri, Reza and Shmatikov, Vitaly, Defeating Image Obfuscation with Deep Learning, arXiv: 1609.00408v2 [online], Sep. 6, 2016 [retrieved on Sep. 23, 2019]. Retrieved from the Internet < URL: http: // arxiv .org /pdf /1609 .00408 .pdf > (Year: 2016).*

*Primary Examiner* — Malcolm Cribbs
(74) *Attorney, Agent, or Firm* — Xsensus LLP

(57) ABSTRACT

A method for learning an obfuscation network used for concealing original data is provided. The method includes steps of: a learning device instructing the obfuscation network to obfuscate inputted training data, inputting the obfuscated training data into a learning network, and allowing the learning network to apply a network operation to the obfuscated training data and thus to generate 1-st characteristic information, and allowing the learning network to apply a network operation to the inputted training data and thus to generate 2-nd characteristic information, and learning the obfuscation network such that an error is minimized, calculated by referring to part of an error acquired by referring to the 1-st and the 2-nd characteristic information, and an error acquired by referring to a task specific output and its corresponding ground truth, and such that an error is maximized, calculated by referring to the training data and the obfuscated training data.

24 Claims, 7 Drawing Sheets
(1 of 7 Drawing Sheet(s) Filed in Color)

(51) Int. Cl.
*G06N 3/04* (2006.01)
*G06F 21/62* (2013.01)

(56) References Cited

U.S. PATENT DOCUMENTS

| | | | |
|---|---|---|---|
| 2017/0213112 A1* | 7/2017 | Sachs | G06K 9/00228 |
| 2019/0095629 A1* | 3/2019 | Lee | G06F 21/602 |
| 2019/0102574 A1* | 4/2019 | Roberts | G06N 20/00 |
| 2019/0164261 A1* | 5/2019 | Sunkavalli | G06T 5/007 |
| 2019/0197667 A1* | 6/2019 | Paluri | H04N 13/139 |
| 2019/0214135 A1* | 7/2019 | Wu | G06T 7/0014 |
| 2019/0216409 A1* | 7/2019 | Zhou | A61B 6/032 |
| 2019/0244362 A1* | 8/2019 | Movshovitz-Attias | G06N 3/0481 |

* cited by examiner

US 10,635,788 B2

METHOD FOR TRAINING AND TESTING OBFUSCATION NETWORK CAPABLE OF PROCESSING DATA TO BE CONCEALED FOR PRIVACY, AND TRAINING DEVICE AND TESTING DEVICE USING THE SAME

CROSS-REFERENCE TO RELATED APPLICATION

The present application claims priority to KR 10-2018-0086929 filed Jul. 26, 2018, the entire contents of which are incorporated herein by reference.

FIELD OF THE DISCLOSURE

The present disclosure relates to a learning method of an obfuscation network for concealing original data for personal information protection and a learning device using the same, and to a testing method of the learned obfuscation network for concealing the original data for personal information protection and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such is referred to as big data in the sense that common software tools and computer systems cannot handle such a huge volume of data.

And, although such big data may be insignificant by itself, it can be useful for generation of new data, judgment, or prediction in various fields through machine learning on patterns and the like.

Recently, due to the strengthening of a personal information protection act, it is required to delete information that can be used for identifying individuals from the data or to acquire consent of the individuals in order to trade or share such big data. However, it is not easy to check if a large amount of big data includes information that can be used for identifying the individuals, and it is impossible to obtain the consent of the individuals. Therefore, various techniques for such purposes are emerging.

As an example of a related prior art, a technique is disclosed in Korean Patent Registration No. 1861520. According to this technique, a face-concealing method is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, in the input image, where the second image is generated to have a facial shape different from that of the facial region detected in the detection step.

However, according to conventional techniques as well as the technique described above, whether identification information such as faces, text, etc. is included in the data is determined, and at least one portion corresponding to the identification information is masked or blurred, thus machine learning cannot utilize such information due to damage to original data, and in some cases, the data even contains unexpected identification information and the unexpected identification information cannot be concealed, e.g., anonymized. In particular, a conventional security camera performs an anonymizing process by blurring all pixels having a change between frames in a video image, and when the anonymizing process is performed in this manner, critical information such as facial expression of an anonymized face becomes different from information contained in an original video image, and the personal identification information missing during face detection may remain on the original video image. Also, the blurred video image may be reverted to the original image using one of conventional video deblurring techniques.

Accordingly, the inventors of the present disclosure propose a method for generating obfuscated data such that the obfuscated data is different from the original data while an output result of inputting the original data into a machine learning model and an output result of inputting the obfuscated data into the learning model are same or similar to each other.

SUMMARY OF THE DISCLOSURE

It is an object of the present disclosure to solve all the aforementioned problems.

It is another object of the present disclosure to perform concealment in a simple and accurate way, since processes of finding personal identification information in data are eliminated.

It is still another object of the present disclosure to protect privacy and security of original data by generating irreversibly obfuscated and concealed data from the original data.

It is still yet another object of the present disclosure to generate data recognized as similar or same by a computer, but recognized as different by a human.

It is still yet another object of the present disclosure to stimulate a big data trade market.

In accordance with one aspect of the present disclosure, there is provided a method for learning an obfuscation network used for concealing original data to protect personal information, including steps of: (a) a learning device, if training data is acquired, inputting the training data into an obfuscation network and instructing the obfuscation network to obfuscate the training data and thus to generate obfuscated training data; (b) the learning device (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data; and (c) the learning device learning the obfuscation network such that (i) at least one 1-st error is minimized which is calculated by referring to at least part of (i-1) at least one (1-1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data.

As one example, the learning network includes a 1-st learning network to an n-th learning network respectively having one or more 1-st learned parameters to one or more n-th learned parameters wherein n is an integer greater than 0, wherein, at the step of (b), the learning device (i) inputs the obfuscated training data into each of the 1-st learning network to the n-th learning network, and allows each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputs the training data into each of the 1-st learning network to the n-th learning network, and allows each of the 1-st learning network to the n-th learning network to (ii-1) apply its corresponding network operation to the training data using respectively the 1-st learned parameters to the n-th learned parameters, and thus to (ii-2) output each piece of (2_1)-st characteristic information to (2_n)-th characteristic information on the training data, and wherein, at the step of (c), the learning device learns the obfuscation network such that (i) the 1-st error is minimized which is calculated by referring to at least part of (i-1) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (i-2) the (1_2)-nd error which is an average over a (1_2)_1-st error to a (1_2)_n-th error wherein the (1_2)_1-st error is acquired by referring to (i-2a) at least one 1-st task specific output created by using the (1_1)-st characteristic information and (i-2b) at least one 1-st ground truth corresponding to the 1-st task specific output, and the (1_2)_n-th error is acquired by referring to (i-2a) at least one n-th task specific output created by using the (1_n)-th characteristic information and (i-2b) at least one n-th ground truth corresponding to the n-th task specific output, and (ii) the 2-nd error is maximized which is calculated by referring to the training data and the obfuscated training data.

As one example, the learning network includes a 1-st learning network to an n-th learning network respectively having one or more 1-st learned parameters to one or more n-th learned parameters wherein n is an integer greater than 0, wherein, at the step of (a), the learning device inputs the training data into the obfuscation network, and allows the obfuscation network to obfuscate the training data and thus to generate 1-st obfuscated training data, wherein, at the step of (b), the learning device (i) inputs the 1-st obfuscated training data into the 1-st learning network, and allows the 1-st learning network to (i-1) apply a network operation to the 1-st obfuscated training data using the 1-st learned parameters of the 1-st learning network and thus to (i-2) output (1_1)-st characteristic information on the 1-st obfuscated training data, and (ii) inputs the training data into the 1-st learning network, and allows the 1-st learning network to (ii-1) apply a network operation to the training data using the 1-st learned parameters and thus to (ii-2) output (2_1)-st characteristic information on the training data, wherein, at the step of (c), the learning device learns the obfuscation network, such that (i) at least one (1_1)-st error is minimized which is calculated by referring to at least part of (i-1) at least one (1_1)_1-st error acquired by referring to the (1_1)-st characteristic information and the (2_1)-st characteristic information, and (i-2) at least one (1_2)_1-st error acquired by referring to (i-2a) at least one 1-st task specific output generated by using the (1_1)-st characteristic information and (i-2b) at least one 1-st ground truth corresponding to the 1-st task specific output, and (ii) at least one (2_1)-st error is maximized which is calculated by referring to the training data and the 1-st obfuscated training data, to thereby allow the obfuscation network to be a 1-st learned obfuscation network, and wherein, while increasing an integer k from 2 to n, the learning device (i) inputs the training data into the (k_1)-st learned obfuscation network, and allows the (k_1)-st learned obfuscation network to obfuscate the training data to generate k-th obfuscated training data, (ii) (ii-1) inputs the k-th obfuscated training data into a k-th learning network, and allows the k-th learning network to apply a network operation to the k-th obfuscated training data using one or more k-th learned parameters of the k-th learning network and thus to output (1_k)-th characteristic information on the k-th obfuscated training data, and (ii-2) inputs the training data into the k-th learning network, and allows the k-th learning network to apply a network operation to the training data using the k-th learned parameters and thus to output (2_k)-th characteristic information on the training data, and (iii) learns the (k_1)-st learned obfuscation network, such that (iii-1) at least one (1_k)-th error is minimized which is calculated by referring to at least part of (iii-1a) at least one (1_1)_k-th error acquired by referring to the (1_k)-th characteristic information and the (2_k)-th characteristic information and (iii-1b) at least one (1_2)_k-th error acquired by referring to at least one k-th task specific output created by using the (1_k)-th characteristic information and by further referring to at least one k-th ground truth corresponding to the k-th task specific output, and (iii-2) at least one (2_k)-th error is maximized which is calculated by referring to the training data and the k-th obfuscated training data, to thereby allow the (k_1)-st learned obfuscation network to be a k-th learned obfuscation network.

As one example, at the step of (c), on condition that at least one obfuscated training data score has been acquired as the 2-nd error which corresponds to the obfuscated training data inputted into a discriminator for determining whether inputted data is real or fake, the learning device (i) learns the obfuscation network such that the 1-st error is minimized and that the 2-nd error is maximized, and (ii) learns the discriminator such that at least one modified training data score or at least one modified obfuscated training data score corresponding to modified training data or modified obfuscated training data inputted into the discriminator is maximized and that the obfuscated training data score is minimized wherein the modified training data or the modified obfuscated training data is generated respectively by modifying the training data or the obfuscated training data.

As one example, the learning network includes a 1-st learning network to an n-th learning network respectively having one or more 1-st learned parameters to one or more n-th learned parameters wherein n is an integer greater than 0, wherein, at the step of (b), the learning device (i) inputs the obfuscated training data into each of the 1-st learning network to the n-th learning network, and allows each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputs the training data into each of the 1-st learning network to the n-th learning network, and allows each of the 1-st learning network to the n-th learning network to (ii-1) apply its corresponding network operation to the training data using respectively the 1-st learned parameters to the n-th learned parameters, and thus to (ii-2) output each piece of (2_1)-st characteristic information to (2_n)-th characteristic information on the training data, and wherein, at the step of (c), the learning device (i) learns the obfuscation network such that the 1-st error is minimized which is calculated by referring to at least part of (i-1) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (i-2) the (1_2)-nd error which is an average over a (1_2)_1-st error to a (1_2)_n-th error wherein the (1_2)_1-st error is acquired by referring to (i-2a) at least one 1-st task specific output created by using the (1_1)-st characteristic information and (i-2b) at least one 1-st ground truth corresponding to the 1-st task specific output, and the (1_2)_n-th error is acquired by referring to (i-2a) at least one n-th task specific output created by using the (1_n)-th characteristic information and (i-2b) at least one n-th ground truth corresponding to the n-th task specific output, and such that the 2-nd error is maximized which is the obfuscated training data score corresponding to the obfuscated training data inputted into the discriminator, and (ii) learns the discriminator such that the modified training data score or the modified obfuscated training data score corresponding to the modified training data or the modified obfuscated training data inputted into the discriminator is maximized and that the obfuscated training data score is minimized.

As one example, the learning network includes a 1-st learning network to an n-th learning network respectively having one or more 1-st learned parameters to one or more n-th learned parameters wherein n is an integer greater than 0, wherein, at the step of (a), the learning device inputs the training data into the obfuscation network, and allows the obfuscation network to obfuscate the training data and thus to generate 1-st obfuscated training data, wherein, at the step of (b), the learning device (i) inputs the 1-st obfuscated training data into the 1-st learning network, and allows the 1-st learning network to (i-1) apply a network operation to the 1-st obfuscated training data using the 1-st learned parameters of the 1-st learning network and thus to (i-2) output (1_1)-st characteristic information on the 1-st obfuscated training data, and (ii) inputs the training data into the 1-st learning network, and allows the 1-st learning network to (ii-1) apply a network operation to the training data using the 1-st learned parameters and thus to (ii-2) output (2_1)-st characteristic information on the training data, wherein, at the step of (c), the learning device learns the obfuscation network, such that (i) at least one (1_1)-st error is minimized which is calculated by referring to at least part of (i-1) at least one (1_1)_1-st error acquired by referring to the (1_1)-st characteristic information and the (2_1)-st characteristic information, and (i-2) at least one (1_2)_1-st error acquired by referring to (i-2a) at least one 1-st task specific output generated by using the (1_1)-st characteristic information and (i-2b) at least one 1-st ground truth corresponding to the 1-st task specific output, and (ii) at least one (2_1)-st error is maximized which is at least one 1-st obfuscated training data score corresponding to the 1-st obfuscated training data inputted into the discriminator, to thereby allow the obfuscation network to be a 1-st learned obfuscation network, and the learning device learns the discriminator, such that (i) at least one 1-st modified training data score or at least one 1-st modified obfuscated training data score is maximized which corresponds to the modified training data or the modified obfuscated training data inputted into the discriminator, and such that (ii) the 1-st obfuscated training data score is minimized, to thereby allow the discriminator to be a 1-st learned discriminator, and wherein, while increasing an integer k from 2 to n, the learning device (i) inputs the training data into the (k_1)-st learned obfuscation network, and allows the (k_1)-st learned obfuscation network to obfuscate the training data to generate k-th obfuscated training data, (ii) (ii-1) inputs the k-th obfuscated training data into a k-th learning network, and allows the k-th learning network to apply a network operation to the k-th obfuscated training data using one or more k-th learned parameters of the k-th learning network and thus to output (1_k)-th characteristic information on the k-th obfuscated training data, and (ii-2) inputs the training data into the k-th learning network, and allows the k-th learning network to apply a network operation to the training data using the k-th learned parameters and thus to output (2_k)-th characteristic information on the training data, (iii) learns a (k_1)-st learned obfuscation network, such that at least one (1_k)-th error is minimized which is calculated by referring to at least part of (iii-1) at least one (1-1)_k-th error acquired by referring to the (1_k)-th characteristic information and the (2_k)-th characteristic information and (iii-2) at least one (1-2)_k-th error acquired by referring to at least one k-th task specific output generated by using the (1_k)-th characteristic information and by further referring to at least one k-th ground truth corresponding to the k-th task specific output and such that at least one (2_k)-th error is maximized which is at least one k-th obfuscated training data score corresponding to the k-th obfuscated training data inputted into the (k_1)-st learned discriminator, to thereby allow the (k_1)-st learned obfuscation network to be a k-th learned obfuscation network, and (iv) learns the (k_1)-st learned discriminator, such that at least one k-th modified training data score or at least one k-th modified obfuscated training data score corresponding to the modified training data or the modified obfuscated training data inputted into the (k_1)-st learned discriminator is maximized and such that the k-th obfuscated training data score is minimized, to thereby allow the (k_1)-st learned discriminator to be a k-th learned discriminator.

As one example, a maximum of the modified training data score or the modified obfuscated training data score corresponding to the modified training data or the modified obfuscated training data inputted into the discriminator is 1 as a value for determining the modified training data or the modified obfuscated training data as real, and a minimum of the obfuscated training data score corresponding to the obfuscated training data inputted into the discriminator is 0 as a value for determining the obfuscated training data as fake. As one example, at the step of (c), the learning device acquires the 1-st error by referring to at least part of (i) difference between the 1-st characteristic information and the 2-nd characteristic information and (ii) at least one difference between the task specific output and the ground truth, and acquires the 2-nd error by referring to at least one difference between the training data and the obfuscated training data.

As one example, the learning device acquires the 1-st error by referring to a norm or a cosine similarity between the 1-st characteristic information and the 2-nd characteristic information.

As one example, at the step of (c), the learning device measures at least one quality by referring to at least part of an entropy and a degree of noise of the obfuscated training data, and acquires the 1-st error by further referring to the measured quality.

In accordance with another aspect of the present disclosure, there is provided a testing method for learning an obfuscation network used for concealing original data to protect personal information, including steps of: (a) a testing device, on condition that a learning device has performed processes of (i) acquiring and inputting training data into an obfuscation network and instructing the obfuscation network to obfuscate the training data and thus to generate obfuscated training data, (ii) inputting the obfuscated training data into a learning network having its own one or more learned parameters, and allowing the learning network to (ii-1) apply a network operation to the obfuscated training data using the learned parameters and thus to (ii-2) generate 1-st characteristic information corresponding to the obfuscated training data, and (iii) inputting the training data into the learning network, and allowing the learning network to (iii-1) apply a network operation to the training data using the learned parameters and thus to (iii-2) generate 2-nd characteristic information corresponding to the training data, and (iv) learning the obfuscation network such that (iv-1) at least one 1-st error is minimized which is calculated by referring to at least part of (iv-1a) at least one (1_1)-st error acquired by referring to the 1-st characteristic information and the 2-nd characteristic information, and (iv-1b) at least one (1_2)-nd error acquired by referring to at least one task specific output generated by using the 1-st characteristic information and by further referring to at least one ground truth corresponding to the task specific output, and (iv-2) at least one 2-nd error is maximized which is calculated by referring to the training data and the obfuscated training data, performing a process of acquiring test data; and (b) the testing device performing processes of inputting the test data into the obfuscation network and allowing the obfuscation network to obfuscate the test data using the learned parameters of the obfuscation network, to thereby output obfuscated test data as concealed test data.

As one example, at the step of (a), the learning network includes a 1-st learning network to an n-th learning network respectively having one or more 1-st learned parameters to one or more n-th learned parameters wherein n is an integer greater than 0, and wherein, the learning device has performed processes of (i) inputting the obfuscated training data into each of the 1-st learning network to the n-th learning network, and allowing each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputting the training data into each of the 1-st learning network to the n-th learning network, and allowing each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of (2_1)-st characteristic information to (2_n)-th characteristic information on the training data, and (iii) learning the obfuscation network such that (iii-1) the 1-st error is minimized which is calculated by referring to at least part of (iii-1a) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is calculated by referring to the training data and the obfuscated training data.

As one example, at the step of (a), the learning device (i) has acquired at least one obfuscated training data score as the 2-nd error which corresponds to the obfuscated training data inputted into a discriminator for determining whether inputted data is real or fake, (ii) has learned the obfuscation network such that the 1-st error is minimized and that the 2-nd error is maximized, and (iii) has learned the discriminator such that at least one modified training data score or at least one modified obfuscated training data score corresponding to modified training data or modified obfuscated training data inputted into the discriminator is maximized and that the obfuscated training data score is minimized wherein the modified training data or the modified obfuscated training data is generated respectively by modifying the training data or the obfuscated training data.

As one example, at the step of (a), the learning network includes a 1-st learning network to an n-th learning network respectively having one or more 1-st learned parameters to one or more n-th learned parameters wherein n is an integer greater than 0, and wherein, the learning device has performed processes of (i) inputting the obfuscated training data into each of the 1-st learning network to the n-th learning network, and allowing each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputting the training data into each of the 1-st learning network to the n-th learning network, and allowing each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of (2_1)-st characteristic information to (2_n)-th characteristic information on the training data, (iii) learning the obfuscation network such that (iii-1) the 1-st error is minimized which is calculated by referring to at least part of (iii-1a) the (1_1)-st error which is an average over a (1_1)_1-st error to a (1_1)_n-th error wherein the (1_1)_1-st error is acquired by referring to the (1_1)-st characteristic information and the (2_1)-st characteristic information, and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is the modified training data score corresponding to the modified training data inputted into the discriminator, and (iv) learning the discriminator such that the modified training data score or the modified obfuscated training data score is maximized which corresponds to the modified training data or the modified obfuscated training data inputted into the discriminator, and that the modified training data score is minimized.

In accordance with still another aspect of the present disclosure, there is provided a learning device for learning an obfuscation network used for concealing original data to protect personal information, including: at least one memory that stores instructions; and at least one processor configured to execute the instructions to perform or support another device to perform processes of: (I) if training data is acquired, inputting the training data into an obfuscation network and instructing the obfuscation network to obfuscate the training data and thus to generate obfuscated training data, (II) (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data, and (III) learning the obfuscation network such that (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data.

As one example, the learning network includes a 1-st learning network to an n-th learning network respectively having one or more 1-st learned parameters to one or more n-th learned parameters wherein n is an integer greater than 0, wherein, at the process of (II), the processor (i) inputs the obfuscated training data into each of the 1-st learning network to the n-th learning network, and allows each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputs the training data into each of the 1-st learning network to the n-th learning network, and allows each of the 1-st learning network to the n-th learning network to (ii-1) apply its corresponding network operation to the training data using respectively the 1-st learned parameters to the n-th learned parameters, and thus to (ii-2) output each piece of (2_1)-st characteristic information to (2_n)-th characteristic information on the training data, and wherein, at the process of (III), the processor learns the obfuscation network such that (i) the 1-st error is minimized which is calculated by referring to at least part of (i-1) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (i-2) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (ii) the 2-nd error is maximized which is calculated by referring to the training data and the obfuscated training data.

As one example, the learning network includes a 1-st learning network to an n-th learning network respectively having one or more 1-st learned parameters to one or more n-th learned parameters wherein n is an integer greater than 0, wherein, at the process of (I), the processor inputs the training data into the obfuscation network, and allows the obfuscation network to obfuscate the training data and thus to generate 1-st obfuscated training data, wherein, at the process of (II), the processor (i) inputs the 1-st obfuscated training data into the 1-st learning network, and allows the 1-st learning network to (i-1) apply a network operation to the 1-st obfuscated training data using the 1-st learned parameters of the 1-st learning network and thus to (i-2) output (1_1)-st characteristic information on the 1-st obfuscated training data, and (ii) inputs the training data into the 1-st learning network, and allows the 1-st learning network to (ii-1) apply a network operation to the training data using the 1-st learned parameters and thus to (ii-2) output (2_1)-st characteristic information on the training data, wherein, at the process of (III), the processor learns the obfuscation network, such that (i) at least one (1_1)-st error is minimized which is calculated by referring to at least part of (i-1) at least one (1_1)_1-st error acquired by referring to the (1_1)-st characteristic information and the (2_1)-st characteristic information, and (i-2) at least one (1_2)_1-st error acquired by referring to at least one 1-st task specific output generated by using the (1_1)-st characteristic information and by further referring to at least one 1-st ground truth corresponding to the 1-st task specific output, and such that (ii) at least one (2_1)-st error is maximized which is calculated by referring to the training data and the 1-st obfuscated training data, to thereby allow the obfuscation network to be a 1-st learned obfuscation network, and wherein, while increasing an integer k from 2 to n, the processor (i) inputs the training data into the (k_1)-st learned obfuscation network, and allows the (k_1)-st learned obfuscation network to obfuscate the training data to generate k-th obfuscated training data, (ii) (ii-1) inputs the k-th obfuscated training data into a k-th learning network, and allows the k-th learning network to apply a network operation to the k-th obfuscated training data using one or more k-th learned parameters of the k-th learning network and thus to output (1_k)-th characteristic information on the k-th obfuscated training data, and (ii-2) inputs the training data into the k-th learning network, and allows the k-th learning network to apply a network operation to the training data using the k-th learned parameters and thus to output (2_k)-th characteristic information on the training data, and (iii) learns the (k_1)-st learned obfuscation network, such that (iii-1) at least one (1_k)-th error is minimized which is calculated by referring to at least part of (iii-1a) at least one (1_1)_k-th error acquired by referring to the (1_k)-th characteristic information and the (2_k)-th characteristic information and (iii-1b) at least one (1_2)_k-th error acquired by referring to at least one k-th task specific output created by using the (1_k)-th characteristic information and by further referring to at least one k-th ground truth corresponding to the k-th task specific output, and (iii-2) at least one (2_k)-th error is maximized which is calculated by referring to the training data and the k-th obfuscated training data, to thereby allow the (k_1)-st learned obfuscation network to be a k-th learned obfuscation network.

As one example, at the process of (III), on condition that at least one obfuscated training data score has been acquired as the 2-nd error which corresponds to the obfuscated training data inputted into a discriminator for determining whether inputted data is real or fake, the processor (i) learns the obfuscation network such that the 1-st error is minimized and that the 2-nd error is maximized, and (ii) learns the discriminator such that at least one modified training data score or at least one modified obfuscated training data score corresponding to modified training data or modified obfuscated training data inputted into the discriminator is maximized and that the obfuscated training data score is minimized wherein the modified training data or the modified obfuscated training data is generated respectively by modifying the training data or the obfuscated training data.

As one example, the learning network includes a 1-st learning network to an n-th learning network respectively having one or more 1-st learned parameters to one or more n-th learned parameters wherein n is an integer greater than 0, wherein, at the process of (II), the processor (i) inputs the obfuscated training data into each of the 1-st learning network to the n-th learning network, and allows each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputs the training data into each of the 1-st learning network to the n-th learning network, and allows each of the 1-st learning network to the n-th learning network to (ii-1) apply its corresponding network operation to the training data using respectively the 1-st learned parameters to the n-th learned parameters, and thus to (ii-2) output each piece of (2_1)-st characteristic information to (2_n)-th characteristic information on the training data, and wherein, at the process of (III), the processor (i) learns the obfuscation network such that the 1-st error is minimized which is calculated by referring to at least part of (i-1) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (i-2) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and such that the 2-nd error is maximized which is the obfuscated training data score corresponding to the obfuscated training data inputted into the discriminator, and (ii) learns the discriminator such that the modified training data score or the modified obfuscated training data score corresponding to the modified training data or the modified obfuscated training data inputted into the discriminator is maximized and that the obfuscated training data score is minimized.

As one example, the learning network includes a 1-st learning network to an n-th learning network respectively having one or more 1-st learned parameters to one or more n-th learned parameters wherein n is an integer greater than 0, wherein, at the process of (I), the processor inputs the training data into the obfuscation network, and allows the obfuscation network to obfuscate the training data and thus to generate 1-st obfuscated training data, wherein, at the process of (II), the processor (i) inputs the 1-st obfuscated training data into the 1-st learning network, and allows the 1-st learning network to (i-1) apply a network operation to the 1-st obfuscated training data using the 1-st learned parameters of the 1-st learning network and thus to (i-2) output (1_1)-st characteristic information on the 1-st obfuscated training data, and (ii) inputs the training data into the 1-st learning network, and allows the 1-st learning network to (ii-1) apply a network operation to the training data using the 1-st learned parameters and thus to (ii-2) output (2_1)-st characteristic information on the training data, wherein, at the process of (III), the processor learns the obfuscation network, such that (i) at least one (1_1)-st error is minimized which is calculated by referring to at least part of (i-1) at least one (1_1)_1-st error acquired by referring to the (1_1)-st characteristic information and the (2_1)-st characteristic information, and (i-2) at least one (1_2)_1-st error acquired by referring to (i-2a) at least one 1-st task specific output generated by using the (1_1)-st characteristic information and (i-2b) at least one 1-st ground truth corresponding to the 1-st task specific output, and (ii) at least one (2_1)-st error is maximized which is at least one 1-st obfuscated training data score corresponding to the 1-st obfuscated training data inputted into the discriminator, to thereby allow the obfuscation network to be a 1-st learned obfuscation network, and the processor learns the discriminator, such that (i) at least one 1-st modified training data score or at least one 1-st modified obfuscated training data score is maximized which corresponds to the modified training data or the modified obfuscated training data inputted into the discriminator, and such that (ii) the 1-st obfuscated training data score is minimized, to thereby allow the discriminator to be a 1-st learned discriminator, and wherein, while increasing an integer k from 2 to n, the processor (i) inputs the training data into the (k_1)-st learned obfuscation network, and allows the (k_1)-st learned obfuscation network to obfuscate the training data to generate k-th obfuscated training data, (ii) (ii-1) inputs the k-th obfuscated training data into a k-th learning network, and allows the k-th learning network to apply a network operation to the k-th obfuscated training data using one or more k-th learned parameters of the k-th learning network and thus to output (1_k)-th characteristic information on the k-th obfuscated training data, and (ii-2) inputs the training data into the k-th learning network, and allows the k-th learning network to apply a network operation to the training data using the k-th learned parameters and thus to output (2_k)-th characteristic information on the training data, (iii) learns a (k_1)-st learned obfuscation network, such that at least one (1_k)-th error is minimized which is calculated by referring to at least part of (iii-1) at least one (1-1)_k-th error acquired by referring to the (1_k)-th characteristic information and the (2_k)-th characteristic information and (iii-2) at least one (1-2)_k-th error acquired by referring to at least one k-th task specific output generated by using the (1_k)-th characteristic information and by further referring to at least one k-th ground truth corresponding to the k-th task specific output and such that at least one (2_k)-th error is maximized which is at least one k-th obfuscated training data score corresponding to the k-th obfuscated training data inputted into the (k_1)-st learned discriminator, to thereby allow the (k_1)-st learned obfuscation network to be a k-th learned obfuscation network, and (iv) learns the (k_1)-st learned discriminator, such that at least one k-th modified training data score or at least one k-th modified obfuscated training data score corresponding to the modified training data or the modified obfuscated training data inputted into the (k_1)-st learned discriminator is maximized and such that the k-th obfuscated training data score is minimized, to thereby allow the (k_1)-st learned discriminator to be a k-th learned discriminator.

As one example, a maximum of the modified training data score or the modified obfuscated training data score corresponding to the modified training data or the modified obfuscated training data inputted into the discriminator is 1 as a value for determining the modified training data or the modified obfuscated training data as real, and a minimum of the obfuscated training data score corresponding to the obfuscated training data inputted into the discriminator is 0 as a value for determining the obfuscated training data as fake.

As one example, at the process of (III), the processor acquires the 1-st error by referring to at least part of (i) difference between the 1-st characteristic information and the 2-nd characteristic information and (ii) at least one difference between the task specific output and the ground truth, and acquires the 2-nd error by referring to at least one difference between the training data and the obfuscated training data.

As one example, the processor acquires the 1-st error by referring to a norm or a cosine similarity between the 1-st characteristic information and the 2-nd characteristic information.

As one example, at the process of (III), the processor measures at least one quality by referring to at least part of an entropy and a degree of noise of the obfuscated training data, and acquires the 1-st error by further referring to the measured quality.

In accordance with still yet another aspect of the present disclosure, there is provided a testing device for learning an obfuscation network used for concealing original data to protect personal information, including: at least one memory that stores instructions; and at least one processor configured to execute the instructions to perform or support another device to perform processes of: (I) on condition that a learning device has performed processes of (i) acquiring and inputting training data into an obfuscation network and instructing the obfuscation network to obfuscate the training data and thus to generate obfuscated training data, (ii) inputting the obfuscated training data into a learning network having its own one or more learned parameters, and allowing the learning network to (ii-1) apply a network operation to the obfuscated training data using the learned parameters and thus to (ii-2) generate 1-st characteristic information corresponding to the obfuscated training data, and (iii) inputting the training data into the learning network, and allowing the learning network to (iii-1) apply a network operation to the training data using the learned parameters and thus to (iii-2) generate 2-nd characteristic information corresponding to the training data, and (iv) learning the obfuscation network such that (iv-1) at least one 1-st error is minimized which is calculated by referring to at least part of (iv-1a) at least one (1_1)-st error acquired by referring to the 1-st characteristic information and the 2-nd characteristic information, and (iv-1b) at least one (1_2)-nd error acquired by referring to at least one task specific output generated by using the 1-st characteristic information and by further referring to at least one ground truth corresponding to the task specific output, and such that (iv-2) at least one 2-nd error is maximized which is calculated by referring to the training data and the obfuscated training data, performing a process of acquiring test data, and (II) inputting the test data into the obfuscation network and allowing the obfuscation network to obfuscate the test data using the learned parameters of the obfuscation network, to thereby output obfuscated test data as concealed test data.

As one example, at the process of (I), the learning network includes a 1-st learning network to an n-th learning network respectively having one or more 1-st learned parameters to one or more n-th learned parameters wherein n is an integer greater than 0, and wherein, the learning device has performed processes of (i) inputting the obfuscated training data into each of the 1-st learning network to the n-th learning network, and allowing each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputting the training data into each of the 1-st learning network to the n-th learning network, and allowing each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of (2_1)-st characteristic information to (2_n)-th characteristic information on the training data, and (iii) learning the obfuscation network such that (iii-1) the 1-st error is minimized which is calculated by referring to at least part of (iii-1a) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is calculated by referring to the training data and the obfuscated training data.

As one example, at the process of (I), the learning device (i) has acquired at least one obfuscated training data score as the 2-nd error which corresponds to the obfuscated training data inputted into a discriminator for determining whether inputted data is real or fake, (ii) has learned the obfuscation network such that the 1-st error is minimized and that the 2-nd error is maximized, and (iii) has learned the discriminator such that at least one modified training data score or at least one modified obfuscated training data score corresponding to modified training data or modified obfuscated training data inputted into the discriminator is maximized and that the obfuscated training data score is minimized wherein the modified training data or the modified obfuscated training data is generated respectively by modifying the training data or the obfuscated training data.

As one example, at the process of (I), the learning network includes a 1-st learning network to an n-th learning network respectively having one or more 1-st learned parameters to one or more n-th learned parameters wherein n is an integer greater than 0, and wherein, the learning device has performed processes of (i) inputting the obfuscated training data into each of the 1-st learning network to the n-th learning network, and allowing each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputting the training data into each of the 1-st learning network to the n-th learning network, and allowing each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of (2_1)-st characteristic information to (2_n)-th characteristic information on the training data, (iii) learning the obfuscation network such that (iii-1) the 1-st error is minimized which is calculated by referring to at least part of (iii-1a) the (1_1)-st error which is an average over a (1_1)_1-st error to a (1_1)_n-th error wherein the (1_1)_1-st error is acquired by referring to the (1_1)-st characteristic information and the (2_1)-st characteristic information, and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is the modified training data score corresponding to the modified training data inputted into the discriminator, and (iv) learning the discriminator such that the modified training data score or the modified obfuscated training data score is maximized which corresponds to the modified training data or the modified obfuscated training data inputted into the discriminator, and that the modified training data score is minimized.

In addition, recordable media that are readable by a computer for storing a computer program to execute the method of the present disclosure are further provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
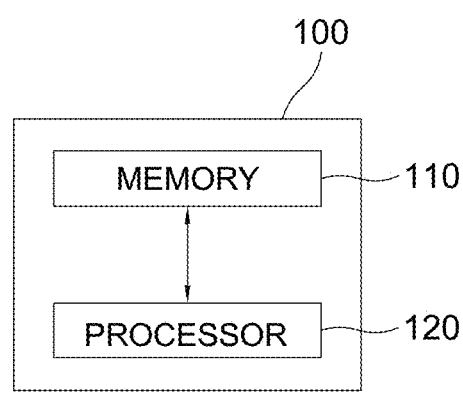
FIG. 1 is a drawing schematically illustrating a learning device for learning an obfuscation network capable of concealing original data in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

To allow those skilled in the art to carry out the present disclosure easily, the example embodiments of the present disclosure will be explained in detail as shown below by referring to attached drawings.

FIG. 1 is a drawing schematically illustrating a learning device for learning an obfuscation network capable of concealing, e.g., anonymizing, original data in accordance with one example embodiment of the present disclosure.

By referring to FIG. 1, the learning device 100 in accordance with one example embodiment of the present disclosure may include a memory 110 for storing instructions to learn the obfuscation network capable of obfuscating training data such that a learning network 100 outputs a result, calculated by using the obfuscated training data as an input, same or similar to a result calculated by using the training data as an input, and a processor 120 for performing processes to learn the obfuscation network according to the instructions in the memory 110.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, if the training data is acquired, according to the instructions stored in the memory 110, the processor 120 of the learning device 100 may input the training data into the obfuscation network, and allow the obfuscation network to obfuscate the training data and thus to generate the obfuscated training data. And, the learning device 100 may perform or support another device to perform processes of (i) inputting the obfuscated training data into the learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data. Thereafter, the learning device 100 may learn the obfuscation network such that (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data.

Also, on condition that at least one obfuscated training data score has been acquired as the 2-nd error which corresponds to the obfuscated training data inputted into a discriminator for determining whether inputted data is real or fake, the learning device 100 may (i) learn the obfuscation network such that the 1-st error is minimized and such that the 2-nd error is maximized, and (ii) learn the discriminator such that at least one modified training data score or at least one modified obfuscated training data score corresponding to the modified training data or the modified obfuscated training data inputted into the discriminator is maximized and such that the obfuscated training data score is minimized.

A method for learning the obfuscation network capable of concealing, e.g., anonymizing, the original data to protect personal information by using the learning device 100 in accordance with one example embodiment of the present disclosure is described by referring to FIGS. 2 to 5 as follows.

Figure 2:
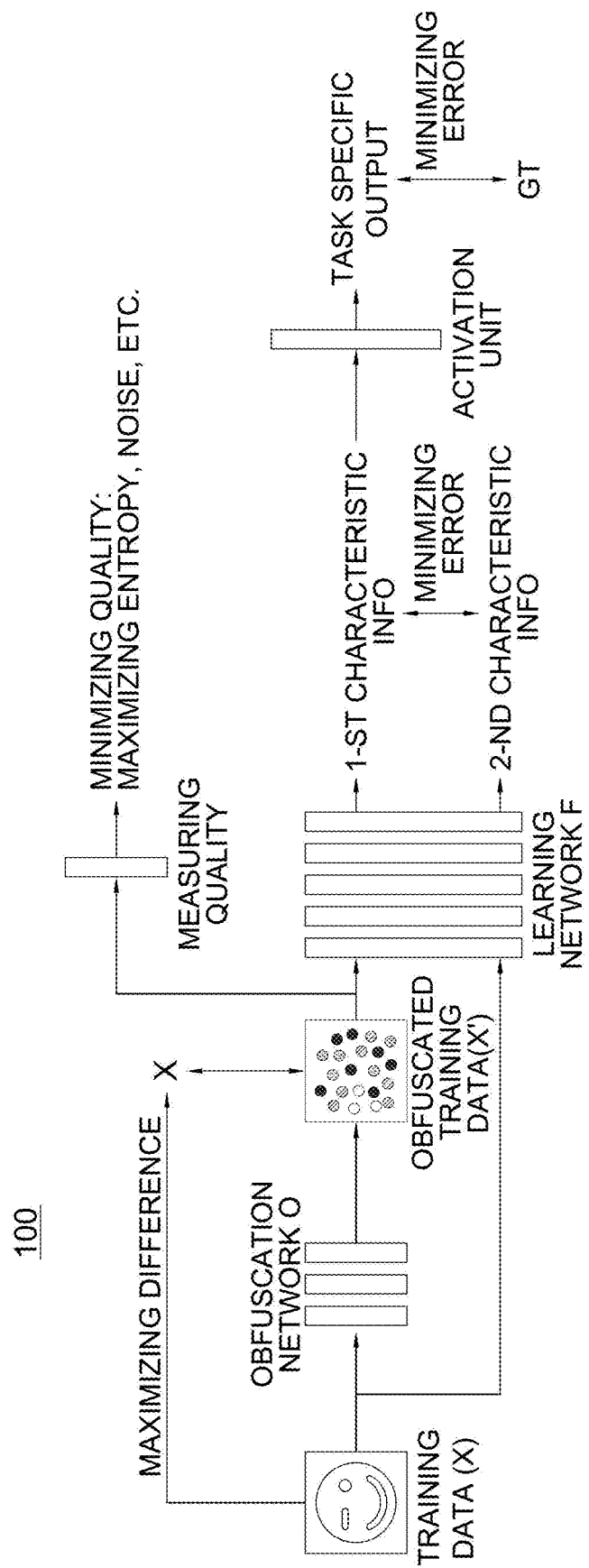
FIG. 2 is a drawing schematically illustrating a learning method for learning the obfuscation network capable of concealing the original data in accordance with one example embodiment of the present disclosure.

FIG. 2 is a drawing schematically illustrating a learning method for learning the obfuscation network capable of concealing the original data in accordance with one example embodiment of the present disclosure.

First, if the training data x is acquired, the learning device 100 may input the training data x into the obfuscation network O, and allow the obfuscation network O to obfuscate the training data x and thus to generate the obfuscated training data x', i.e., O(x).

Herein, the training data x may be original training data which is the original data to be used for learning, or may be the modified training data generated by modifying the original training data, and the modified training data may be generated by adding at least one random noise created through a random noise generating network (not illustrated) to the original training data. As one example, the random noise generating network may be instructed to generate the random noise having a normal distribution $N(0, \sigma)$, and the generated noise may be added to the original training data, to thereby generate the modified training data. Also, the modified training data may be generated by blurring the original training data, or changing a resolution of the original training data, as well as using the random noise, but the scope of the present disclosure is not limited thereto, and various ways of modifying the original training data may be used.

Also, the obfuscated training data x' may be recognized as data different from the training data x by a human, but may be recognized as data similar or same as the training data x by the learning network.

Meanwhile, as one example, the obfuscation network O may include an encoder having one or more convolutional layers for applying one or more convolution operations to images as the training data x, and a decoder having one or more deconvolutional layers for applying one or more deconvolution operations to at least one feature map outputted from the encoder and for generating the obfuscated training data x', but the scope of the present disclosure is not limited thereto, and may include any learning networks having various structures capable of obfuscating the inputted training data.

Next, the learning device 100 may perform or support another device to perform processes of (i) inputting the obfuscated training data x' into the learning network F having its own one or more learned parameters, and allowing the learning network F to (i-1) apply a network operation to the obfuscated training data x' using the learned parameters and thus to (i-2) generate 1-st characteristic information F(x') corresponding to the obfuscated training data x', and (ii) inputting the training data x into the learning network F, and allowing the learning network F to (ii-1) apply a network operation to the training data x using the learned parameters and thus to (ii-2) generate 2-nd characteristic information F(x) corresponding to the training data x.

Herein, the learning network F may include a machine learning network, but the scope of the present disclosure is not limited thereto, and may include any learning networks capable of, using their own learned parameters, generating the 1-st characteristic information F(x') by applying a network operation to the obfuscated training data x', and generating the 2-nd characteristic information F(x) by applying a network operation to the training data x. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be concealed, e.g., a subject to be anonymized, may be personal information included in the original data x. Herein, the personal information may include any information related to a person, such as personal identification information, personal medical information, personal biometric information, personal behavioral information, etc.

And, the 1-st characteristic information F(x') and the 2-nd characteristic information F(x) may be features or logits respectively corresponding to the obfuscated training data x' and the training data x. Also, the 1-st characteristic information F(x') and the 2-nd characteristic information F(x) may be feature values related to certain features respectively in the obfuscated training data x' and the training data x, or the logits including values related to at least one of vectors, matrices, and coordinates related to the certain features. For example, if the training data x are facial image data, the result above may be classes for face recognition, facial features, e.g., laughing expressions, coordinates of facial landmark points, e.g., both end points on far sides of an eye. Next, the learning device 100 may learn the obfuscation network O such that (i) at least one 1-st error is minimized which is calculated by referring to at least part of (i-1) at least one (1_1)-st error acquired by referring to the 1-st characteristic information F(x') and the 2-nd characteristic information F(x), and (i-2) at least one (1_2)-nd error acquired by referring to at least one task specific output generated by using the 1-st characteristic information F(x') and by further referring to at least one ground truth corresponding to the task specific output, and such that (ii) at least one 2-nd error is maximized which is calculated by referring to the training data x and the obfuscated training data x'. That is, the learning device 100 may learn the obfuscation network O, such that the obfuscation network O outputs the obfuscated training data x' much different from the training data x by using the 2-nd error, and such that the obfuscation network O obfuscates the training data by using the 1-st error, in order for the learning network F to recognize the obfuscated training data x' as same or similar to the training data x, to thereby output the obfuscated training data x'.

Herein, the learning device 100 may acquire the 1-st error by referring to at least part of (i) difference between the 1-st characteristic information F(x') and the 2-nd characteristic information F(x) and (ii) at least one difference between the task specific output and its corresponding ground truth. As one example, the learning device 100 may acquire the 1-st error by referring to a norm or a cosine similarity between the 1-st characteristic information F(x') and the 2-nd characteristic information F(x), but the scope of the present disclosure is not limited thereto, and any various algorithms capable of calculating difference between the 1-st characteristic information F(x') and the 2-nd characteristic information F(x) may be used. Also, the learning device 100 may acquire the 2-nd error by referring to at least one difference between the training data x and the obfuscated training data x'.

Also, the learning device 100 may measure at least one quality by referring to at least part of an entropy and a degree of noise of the obfuscated training data x', and may acquire the 1-st error by further referring to the measured quality. That is, the learning device 100 may learn the obfuscation network O, such that the quality of the obfuscated training data x' is minimized, for example, such that the entropy, noise, etc. of the obfuscated training data x' is maximized.

And, if the learning device 100 learns the obfuscation network O such that the 1-st error is minimized and that the 2-nd error is maximized, then the learning device 100 may fix and not update learned parameters of the learning network F, and may proceed with learning the obfuscation network O only.

Meanwhile, the task specific output may be an output of a task to be performed by the learning network F, and may have various results according to the task learned by the learning network F, such as a probability of a class for classification, coordinates resulting from regression for location detection, etc., and an activation function of an activation unit may be applied to characteristic information outputted from the learning network F, to thereby generate the task specific output according to the task to be performed by the learning network F. Herein, the activation function may include a sigmoid function, a linear function, a softmax function, an rlinear function, a square function, a sqrt function, an srlinear function, an abs function, a tanh function, a brlinear function, etc. but the scope of the present disclosure is not limited thereto.

As one example, when the learning network F performs the task for the classification, the learning device 100 may map the 1-st characteristic information outputted from the learning network F onto each of classes, to thereby generate one or more probabilities of the obfuscated training data, for each of the classes.

Herein, the probabilities for each of the classes may represent probabilities of the 1-st characteristic information F(x'), outputted for each of the classes from the learning network F, being correct. For example, if the training data are the facial image data, a probability of the face having a laughing expression may be outputted as 0.75, and a probability of the face not having the laughing expression may be outputted as 0.25, and the like. Herein, a softmax algorithm may be used for mapping the 1-st characteristic information F(x') outputted from the learning network F onto each of the classes, but the scope of the present disclosure is not limited thereto, and various algorithms may be used for mapping the 1-st characteristic information F(x') onto each of the classes.

Figure 3:
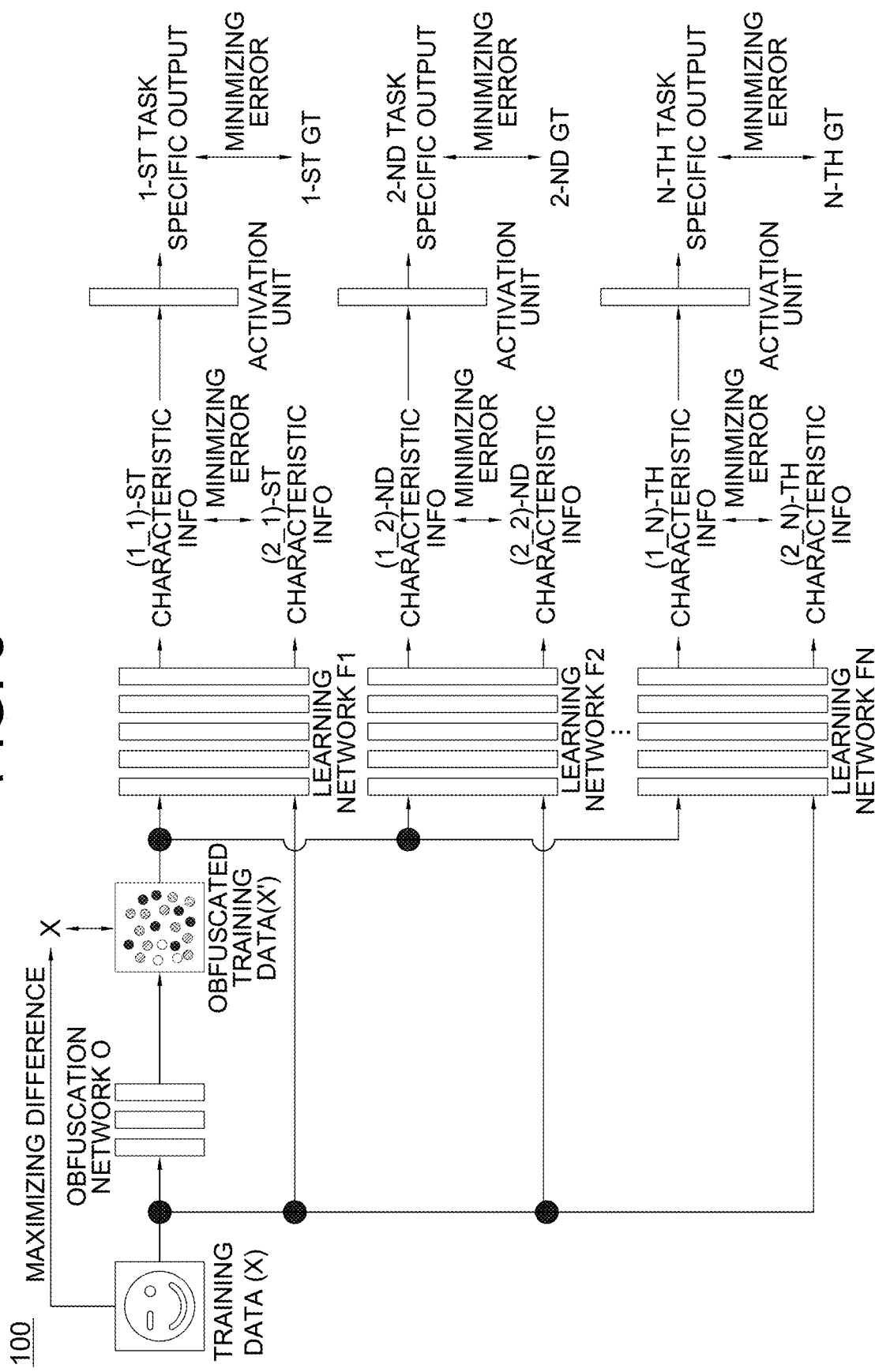
FIG. 3 is a drawing schematically illustrating another learning method for learning the obfuscation network capable of concealing the original data in accordance with one example embodiment of the present disclosure.

FIG. 3 is a drawing schematically illustrating another learning method for learning the obfuscation network capable of concealing the original data in accordance with one example embodiment of the present disclosure, that is, the learning network F in FIG. 2 is configured as multiple learning network F1, F2, . . . , and Fn having their own learned parameters. Herein, each of the multiple learning networks F1, F2, . . . , and Fn may have completed learning to perform tasks at least part of which may be different from each other. In the description below, the part easily deducible from the explanation of FIG. 2 will be omitted.

First, if the training data x is acquired, the learning device 100 may input the training data x into the obfuscation network O, and allow the obfuscation network O to obfuscate the training data x and thus to generate the obfuscated training data x', i.e., O(x).

Herein, the training data x may be the original training data which is the original data to be used for learning, or may be the modified training data x' generated by modifying the original training data, and the obfuscated training data x' may be recognized as data different from the training data x by a human, but may be recognized as data similar or same as the training data x by the learning network.

Next, the learning device 100 may input the obfuscated training data x' into each of the 1-st learning network F1 to the n-th learning network Fn, and allow each of the 1-st learning network F1 to the n-th learning network Fn to (i) apply its corresponding network operation to the obfuscated training data x' using respectively the 1-st learned parameters to the n-th learned parameters of the 1-st learning network F1 to the n-th learning network Fn, and thus to (ii) generate each piece of (1_1)-st characteristic information F1(x') to (1_n)-th characteristic information Fn(x') corresponding to the obfuscated training data x'. Also, the learning device 100 may input the training data x into each of the 1-st learning network F1 to the n-th learning network Fn, and allow each of the 1-st learning network F1 to the n-th learning network Fn to (i) apply its corresponding network operation to the training data x using respectively the 1-st learned parameters to the n-th learned parameters of the 1-st learning network F1 to the n-th learning network Fn, and thus to (ii) generate each piece of (2_1)-st characteristic information F1(x) to (2_n)-th characteristic information Fn(x) corresponding to the training data x.

Next, the learning device 100 may learn the obfuscation network O such that (i) the 1-st error is minimized which is calculated by referring to at least part of (i-1) the (1_1)-st error which is an average over a (1_1)_1-st error to a (1_1)_n-th error wherein the (1_1)_1-st error is acquired by referring to the (1_1)-st characteristic information F1(x') and the (2_1)-st characteristic information F1(x) and the (1_1)_n-th error is acquired by referring to the (1_n)-th characteristic information Fn(x') and the (2_n)-th characteristic information Fn(x), and (i-2) the (1_2)-nd error which is an average over a (1_2)_1-st error to a (1_2)_n-th error wherein the (1_2)_1-st error is acquired by referring to at least one 1-st task specific output created by using the (1_1)-st characteristic information F1(x') and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (ii) the 2-nd error is maximized which is calculated by referring to the training data x and the obfuscated training data x'.

That is, the learning device 100 may acquire the (1_1)_1-st error calculated by referring to the (1_1)-st characteristic information F1(x') and the (2_1)-st characteristic information F1(x), acquire the (1_1)_2-nd error calculated by referring to the (1_2)-nd characteristic information F2(x') and the (2_2)-nd characteristic information F2(x), and similarly acquire the (1_1)_n-th error calculated by referring to the (1_n)-th characteristic information Fn(x') and the (2_n)-th characteristic information Fn(x), and thus acquire a (1_1)-st error which is an average over the acquired (1_1)_1-st error to the acquired (1_1)_n-th error. Then, the learning device 100 may acquire a (1_2)_1-st error to a (1_2)_n-th error where the (1_2)_1-st error is calculated by referring to the 1-st task specific output created by using the (1_1)-st characteristic information F1(x') and the 1-st ground truth corresponding to the the 1-st task specific output and the (1_2)_n-th error is calculated by referring to the n-th task specific output created by using the (1_n)-th characteristic information Fn(x') and the n-th ground truth corresponding to the the n-th task specific output, and thus acquire a (1_2)-nd error which is an average over the acquired (1_2)_1-st error to the (1_2)_n-th error. And, the learning device 100 may learn the obfuscation network O such that the 1-st error is minimized which is calculated by referring to at least part of the (1_1)-st error and the (1_2)-nd error, and such that the 2-nd error is maximized. That is, the 1-st error may be one of the (1_1)-st error, the (1_2)-nd error, and a sum of the (1_1)-st error and the (1_2)-nd error, but the scope of the present disclosure is not limited thereto.

Also, the learning device 100 may measure at least one quality by referring to at least part of an entropy and a degree of noise of the obfuscated training data x', and may acquire the 1-st error by further referring to the measured quality. That is, the learning device 100 may learn the obfuscation network O, such that the quality of the obfuscated training data x' is minimized, for example, such that the entropy, noise, etc. of the obfuscated training data x' is maximized.

And, if the learning device 100 learns the obfuscation network O such that the 1-st error is minimized and that the 2-nd error is maximized, then the learning device 100 may fix and not update the learned parameters of the learning network F, and may proceed with learning the obfuscation network O only.

Meanwhile, in the above description, the learning device 100 may learn the obfuscation network O such that (i) the 1-st error is minimized which is calculated by referring to at least part of (i-1) the (1_1)-st error which is an average over the (1_1)_1-st error to the (1_1)_n-th error wherein the (1_1)_1-st error is acquired by referring to the (1_1)-st characteristic information F1(x') and the (2_1)-st characteristic information F1(x) and the (1_1)_n-th error is acquired by referring to the (1_n)-th characteristic information Fn(x')

and the (2_n)-th characteristic information Fn(x), and (i-2) the (1_2)-nd error which is an average over the (1_2)_1-st error to the (1_2)_n-th error wherein the (1_2)_1-st error is acquired by referring to the 1-st task specific output created by using the (1_1)-st characteristic information F1(x') and by further referring to the 1-st ground truth corresponding to the 1-st task specific output, and the (1_2)_n-th error is acquired by referring to the n-th task specific output created by using the (1_n)-th characteristic information and by further referring to the n-th ground truth corresponding to the n-th task specific output, and (ii) the 2-nd error is maximized which is calculated by referring to the training data x and the obfuscated training data x'. As another example, the obfuscation network O may be sequentially learned such that the (1_1)-st error to the (1_n)-th error are minimized where the (1_1)-st error is calculated by referring to at least part of the (1_1)_1-st error and the (1_2)_1-st error, and the (1_n)-th error is calculated by referring to at least part of the (1_1)_n-th error and the (1_2)_n-th error.

That is, the learning device 100 may input the training data x into the obfuscation network O, and allow the obfuscation network O to obfuscate the training data x and thus to generate 1-st obfuscated training data x1'. And, the learning device 100 may perform or support another device to perform processes of (i) inputting the 1-st obfuscated training data x1' into the 1-st learning network F1, and allowing the 1-st learning network F1 to (i-1) apply a network operation to the 1-st obfuscated training data x1' using the 1-st learned parameters of the 1-st learning network F1 and thus to (i-2) output (1_1)-st characteristic information F1(x1') corresponding to the 1-st obfuscated training data x1', and (ii) inputting the training data x into the 1-st learning network F1, and allowing the 1-st learning network F1 to (ii-1) apply a network operation to the training data x using the 1-st learned parameters and thus to (ii-2) output the (2_1)-st characteristic information F1(x) corresponding to the training data x. Thereafter, the learning device 100 may learn the obfuscation network O, such that (i) at least one (1_1)-st error is minimized which is calculated by referring to at least part of (i-1) at least one (1_1)_1-st error acquired by referring to the (1_1)-st characteristic information F1(x1') and the (2_1)-st characteristic information F1(x), and (i-2) at least one (1_2)_1-st error acquired by referring to at least one 1-st task specific output generated by using the (1_1)-st characteristic information F1(x') and by further referring to at least one 1-st ground truth corresponding to the 1-st task specific output, and (ii) at least one (2_1)-st error is maximized which is calculated by referring to the training data x and the 1-st obfuscated training data x1', to thereby allow the obfuscation network O to be a 1-st learned obfuscation network O1.

And, the learning device 100, while increasing an integer k from 2 to n, may repeat the processes above up to the n-th learning network Fn, to thereby acquire an n-th obfuscation network On.

That is, the learning device 100 may input the training data x into a (k_1)-st learned obfuscation network O(k_1), and allow the (k_1)-st learned obfuscation network O(k_1) to obfuscate the training data x and thus to generate k-th obfuscated training data xk'. And, the learning device 100 may (i) input the k-th obfuscated training data xk' into a k-th learning network Fk, and allow the k-th learning network Fk to apply a network operation to the k-th obfuscated training data xk' using one or more k-th learned parameters of the k-th learning network Fk and thus to output (1_k)-th characteristic information Fk(xk') corresponding to the k-th obfuscated training data xk', and (ii) input the training data x into the k-th learning network Fk, and allow the k-th learning network Fk to apply a network operation to the training data x using the k-th learned parameters and thus to output (2_k)-th characteristic information Fk(xk) corresponding to the training data x. Thereafter, the learning device 100 may learn the (k_1)-st learned obfuscation network O(k_1), such that (i) at least one (1_k)-th error is minimized which is calculated by referring to at least part of (i-1) at least one (1_1) k-th error acquired by referring to the (1_k)-th characteristic information Fk(xk') and the (2_k)-th characteristic information Fk(x), and (i-2) at least one (1_2) k-th error acquired by referring to at least one k-th task specific output generated by using the (1_k)-th characteristic information and by further referring to at least one k-th ground truth corresponding to the k-th task specific output, and such that (ii) at least one (2_k)-th error is maximized which is calculated by referring to the training data x and the k-th obfuscated training data xk', to thereby allow the (k_1)-st learned obfuscation network O(k_1) to be a k-th learned obfuscation network Ok.

Figure 4:
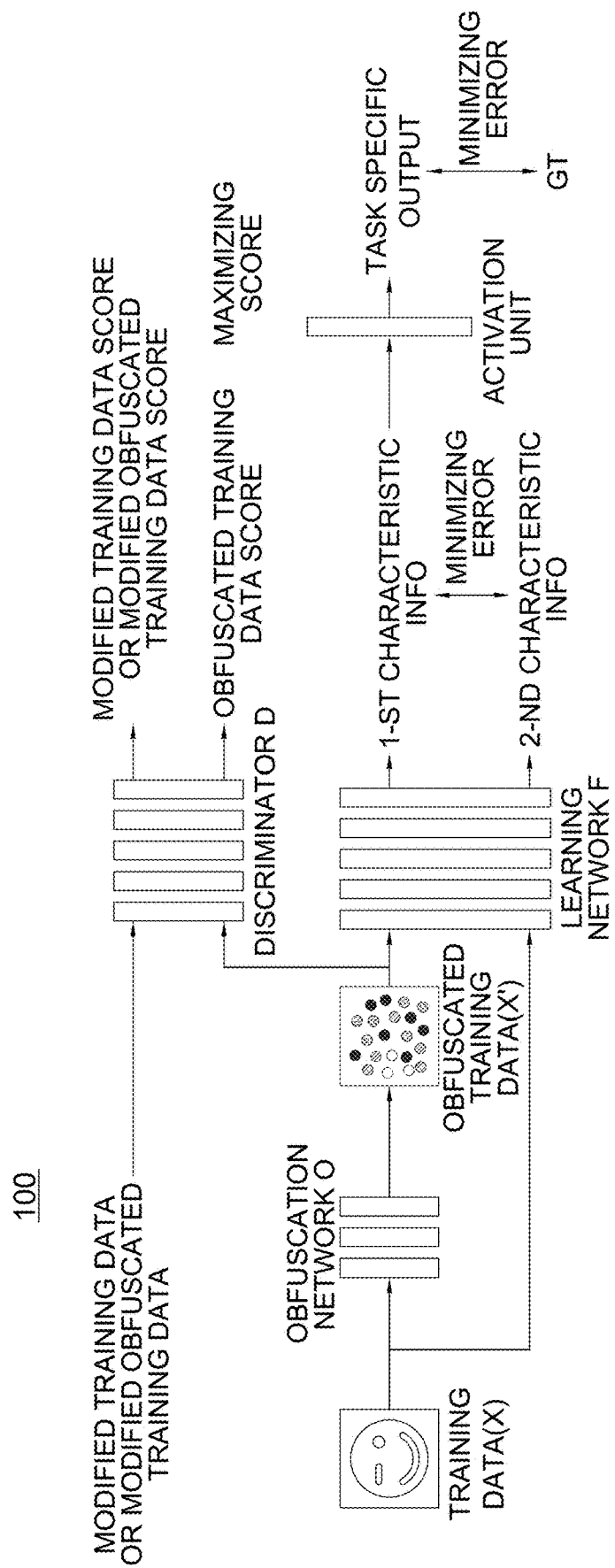
FIG. 4 is a drawing schematically illustrating a learning method for learning the obfuscation network capable of concealing the original data in accordance with another example embodiment of the present disclosure.

FIG. 4 is a drawing schematically illustrating a learning method for learning the obfuscation network capable of concealing the original data in accordance with another example embodiment of the present disclosure. In the description below, the part easily deducible from the explanation of FIGS. 2 and 3 will be omitted.

First, if the training data x is acquired, the learning device 100 may input the training data x into the obfuscation network O, and allow the obfuscation network O to obfuscate the training data x and thus to generate the obfuscated training data x', i.e., O(x).

Next, the learning device 100 may perform or support another device to perform processes of (i) inputting the obfuscated training data x' into the learning network F having its own one or more learned parameters, and allowing the learning network F to (i-1) apply a network operation to the obfuscated training data x' using the learned parameters and thus to (i-2) generate the 1-st characteristic information F(x') corresponding to the obfuscated training data x', and (ii) inputting the training data x into the learning network F, and allowing the learning network F to (ii-1) apply a network operation to the training data x using the learned parameters and thus to (ii-2) generate the 2-nd characteristic information F(x) corresponding to the training data x.

Next, on condition that at least one obfuscated training data score has been acquired as the 2-nd error which corresponds to the obfuscated training data x' inputted into the discriminator D for determining whether the inputted data is real or fake, the learning device 100 may (i) learn the obfuscation network O such that the 1-st error is minimized and such that the 2-nd error is maximized, and (ii) learn the discriminator D such that at least one modified training data score or at least one modified obfuscated training data score corresponding to the modified training data or the modified obfuscated training data inputted into the discriminator D is maximized and that the obfuscated training data score is minimized. Herein, the modified training data or the modified obfuscated training data may be respectively generated by adding at least one random noise created through a random noise generating network (not illustrated) to the training data x or the obfuscated training data x'. As one example, the random noise generating network may be instructed to generate the random noise having a normal distribution N(0, σ), and the generated noise may be added to the training data x or obfuscated training data x', to thereby respectively generate the modified training data or the modified obfuscated training data. Also, the modified training data or the modified obfuscated training data may be generated by blurring the training data x or the obfuscated training data x', or changing a resolution of the training data x or the obfuscated training data x', but the scope of the present disclosure is not limited thereto, and various ways of modifying the training data or modifying the obfuscated training data may be used.

That is, the learning device 100 may learn the obfuscation network O, such that the learning network F obfuscates the training data x by using the 1-st error, to thereby output the obfuscated training data x' in order for the obfuscated training data x' to be recognized as same or similar to the training data x, and such that the learning network F outputs, by using the 2-nd error, the obfuscated training data x' which is different from the training data x but difficult to differentiate from the training data x.

Herein, a maximum of the modified training data score or the modified obfuscated training data score corresponding to the modified training data x or the modified obfuscated training data inputted into the discriminator D may be 1 as a value for determining the modified training data or the modified obfuscated training data as real, and a minimum of the obfuscated training data score corresponding to the obfuscated training data x' inputted into the discriminator D may be 0 as a value for determining the obfuscated training data x' as fake. That is, the discriminator D may be learned to recognize the obfuscated training data x' as the modified training data or the modified obfuscated training data.

Figure 5:
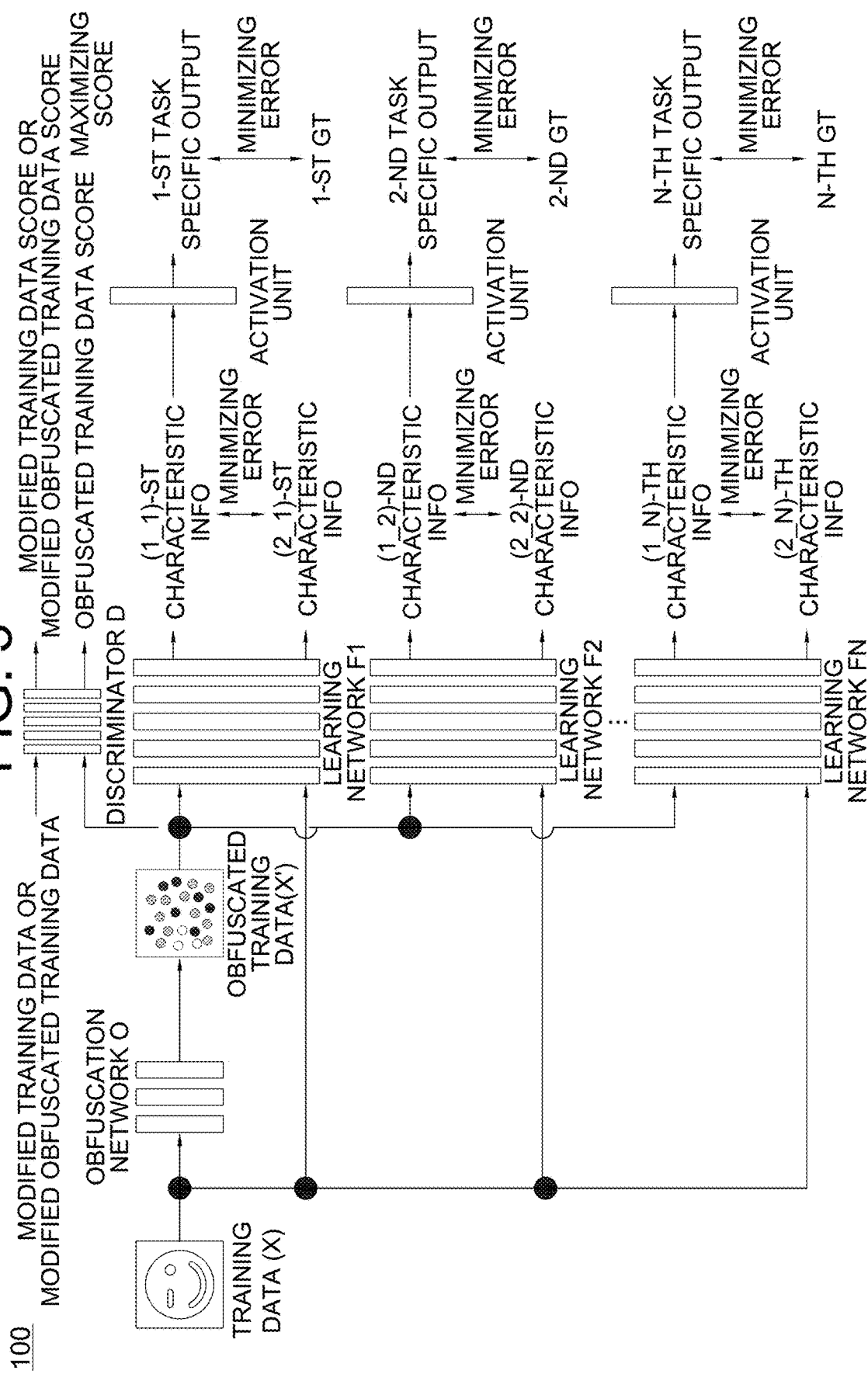
FIG. 5 is a drawing schematically illustrating another learning method for learning the obfuscation network capable of concealing the original data in accordance with another example embodiment of the present disclosure.

FIG. 5 is a drawing schematically illustrating another learning method for learning the obfuscation network capable of concealing the original data in accordance with another example embodiment of the present disclosure, that is, the learning network F in FIG. 4 is configured as the multiple learning network F1, F2, . . . , and Fn having their own learned parameters. In the description below, the part easily deducible from the explanation of FIGS. 2 to 4 will be omitted.

First, if the training data x is acquired, the learning device 100 may input the training data x into the obfuscation network O, and allow the obfuscation network O to obfuscate the training data x and thus to generate the obfuscated training data x', i.e., O(x).

Next, the learning device 100 may input the obfuscated training data x' into each of the 1-st learning network F1 to the n-th learning network Fn, and allow each of the 1-st learning network F1 to the n-th learning network Fn to (i) apply its corresponding network operation to the obfuscated training data x' using respectively the 1-st learned parameters to the n-th learned parameters of the 1-st learning network F1 to the n-th learning network Fn, and thus to (ii) generate each piece of the (1_1)-st characteristic information F1(x') to the (1_n)-th characteristic information Fn(x') corresponding to the obfuscated training data x'. Also, the learning device 100 may input the training data x into each of the 1-st learning network F1 to the n-th learning network Fn, and allow each of the 1-st learning network F1 to the n-th learning network Fn to (i) apply its corresponding network operation to the training data x using respectively the 1-st learned parameters to the n-th learned parameters of the 1-st learning network F1 to the n-th learning network Fn, and thus to (ii) generate each piece of the (2_1)-st characteristic information F1(x) to the (2_n)-th characteristic information Fn(x) corresponding to the training data x.

Next, the learning device 100 may learn the obfuscation network O such that (i) the 1-st error is minimized which is calculated by referring to at least part of (i-1) the (1_1)-st error which is an average over a (1_1)_1-st error to a (1_1)_n-th error wherein the (1_1)_1-st error is acquired by referring to the (1_1)-st characteristic information F1(x') and the (2_1)-st characteristic information F1(x) and the (1_1)_n-th error is acquired by referring to the (1_n)-th characteristic information Fn(x') and the (2_n)-th characteristic information Fn(x), and (i-2) the (1_2)-nd error which is an average over a (1_2)_1-st error to a (1_2)_n-th error wherein the (1_2)_1-st error is acquired by referring to at least one 1-st task specific output created by using the (1_1)-st characteristic information F1(x') and by further referring to at least one 1-st ground truth corresponding to the 1-st task specific output, and the (1_2)_n-th error is acquired by referring to at least one n-th task specific output created by using the (1_n)-th characteristic information Fn(x') and by further referring to at least one n-th ground truth corresponding to the n-th task specific output, and (ii) the 2-nd error is maximized which is the obfuscated training data score corresponding to the obfuscated training data x' inputted into the discriminator D. And the learning device 100 may learn the discriminator D such that the modified training data score or the modified obfuscated training data score is maximized which corresponds to the modified training data or the modified obfuscated training data inputted into the discriminator D, and that the obfuscated training data score is minimized.

That is, the learning device 100 may acquire the (1_1)_1-st error calculated by referring to the (1_1)-st characteristic information F1(x') and the (2_1)-st characteristic information F1(x), acquire the (1_1)_2-nd error calculated by referring to the (1_2)-nd characteristic information F2(x') and the (2_2)-nd characteristic information F2(x), and similarly acquire the (1_1)_n-th error calculated by referring to the (1_n)-th characteristic information Fn(x') and the (2_n)-th characteristic information Fn(x), and thus acquire a (1_1)-st error which is an average over the acquired (1_1)_1-st error to the acquired (1_1)_n-th error. Then, the learning device 100 may acquire a (1_2)_1-st error to a (1_2)_n-th error where the (1_2)_1-st error is calculated by referring to the 1-st task specific output created by using the (1_1)-st characteristic information F1(x') and the 1-st ground truth corresponding to the the 1-st task specific output and the (1_2)_n-th error is calculated by referring to the n-th task specific output created by using the (1_n)-th characteristic information Fn(x') and the n-th ground truth corresponding to the the n-th task specific output, and thus acquire a (1_2)-nd error which is an average over the acquired (1_2)_1-st error to the (1_2)_n-th error. And, the learning device 100 may learn the obfuscation network O such that the 1-st error is minimized which is calculated by referring to at least part of the (1_1)-st error and the (1_2)-nd error, and that the 2-nd error is maximized.

Meanwhile, in the above description, the learning device 100 may learn the obfuscation network O such that (i) the 1-st error is minimized which is calculated by referring to at least part of (i-1) the (1_1)-st error which is an average over the (1_1)_1-st error to the (1_1)_n-th error wherein the (1_1)_1-st error is acquired by referring to the (1_1)-st characteristic information F1(x') and the (2_1)-st characteristic information F1(x) and the (1_1)_n-th error is acquired by referring to the (1_n)-th characteristic information Fn(x') and the (2_n)-th characteristic information Fn(x), and (i-2) the (1_2)-nd error which is an average over the (1_2)_1-st error to the (1_2)_n-th error wherein the (1_2)_1-st error is acquired by referring to the 1-st task specific output created by using the (1_1)-st characteristic information F1(x') and by further referring to the 1-st ground truth corresponding to the 1-st task specific output, and the (1_2)_n-th error is acquired by referring to the n-th task specific output created by using the (1_n)-th characteristic information and by further referring to the n-th ground truth corresponding to the n-th task specific output, and (ii) the 2-nd error is maximized which is the obfuscated training data score corresponding to the obfuscated training data inputted into the discriminator. As another example, the obfuscation network O may be sequentially learned such that the (1_1)-st error to the (1_n)-th error are minimized where the (1_1)-st error is calculated by referring to at least part of the (1_1)_1-st error and the (1_2)_1-st error, and the (1_n)-th error is calculated by referring to at least part of the (1_1)_n-th error and the (1_2)_n-th error.

That is, the learning device 100 may input the training data x into the obfuscation network O, and allow the obfuscation network O to obfuscate the training data x and thus to generate the 1-st obfuscated training data x1'. And, the learning device 100 may perform or support another device to perform processes of (i) inputting the 1-st obfuscated training data x1' into the 1-st learning network F1, and allowing the 1-st learning network F1 to (i-1) apply a network operation to the 1-st obfuscated training data x1' using the 1-st learned parameters of the 1-st learning network F1 and thus to (i-2) output (1_1)-st characteristic information F1(x1') corresponding to the 1-st obfuscated training data x1', and (ii) inputting the training data x into the 1-st learning network F1, and allowing the 1-st learning network F1 to (ii-1) apply a network operation to the training data x using the 1-st learned parameters and thus to (ii-2) output the (2_1)-st characteristic information F1(x) corresponding to the training data x. Thereafter, the learning device 100 may learn the obfuscation network O, such that (i) at least one (1_1)-st error is minimized which is calculated by referring to at least part of (i-1) at least one (1_1)_1-st error acquired by referring to the (1_1)-st characteristic information F1(x1') and the (2_1)-st characteristic information F1(x), and (i-2) at least one (1_2)_1-st error acquired by referring to at least one 1-st task specific output generated by using the (1_1)-st characteristic information F1(x') and by further referring to at least one 1-st ground truth corresponding to the 1-st task specific output, and (ii) at least one (2_1)-st error is maximized which is at least one 1-st obfuscated training data score corresponding to the 1-st obfuscated training data x1' inputted into the discriminator D, to thereby allow the obfuscation network O to be the 1-st learned obfuscation network O1. And the learning device 100 may learn the discriminator D, such that at least one 1-st modified training data score or at least one 1-st modified obfuscated training data score is maximized which corresponds to the modified training data or the modified obfuscated training data inputted into the discriminator D and that at least one 1-st obfuscated training data score is minimized, to thereby allow the discriminator D to be a 1-st learned discriminator D1.

And, the learning device 100, while increasing an integer k from 2 to n, may repeat the processes above up to the n-th learning network Fn, to thereby acquire an n-th obfuscation network On.

That is, the learning device 100 may input the training data x into a (k_1)-st learned obfuscation network O(k_1), and allow the (k_1)-st learned obfuscation network O(k_1) to obfuscate the training data x and thus to generate k-th obfuscated training data xk'. And, the learning device 100 may (i) input the k-th obfuscated training data xk' into the k-th learning network Fk, and allow the k-th learning network Fk to apply a network operation to the k-th obfuscated training data xk' using one or more k-th learned parameters of the k-th learning network Fk and thus to output the (1_k)-th characteristic information Fk(xk') corresponding to the k-th obfuscated training data xk', and (ii) input the training data x into the k-th learning network Fk, and allow the k-th learning network Fk to apply a network operation to the training data x using the k-th learned parameters and thus to output the (2_k)-th characteristic information Fk(xk) corresponding to the training data x. Thereafter, the learning device 100 may learn the (k_1)-st learned obfuscation network O(k_1), such that (i) at least one (1_k)-th error is minimized which is calculated by referring to at least part of (i-1) at least one (1_1)_k-th error acquired by referring to the (1_k)-th characteristic information Fk(xk') and the (2_k)-th characteristic information Fk(x), and (i-2) at least one (1_2)_k-th error acquired by referring to at least one k-th task specific output generated by using the (1_k)-th characteristic information Fk(x') and by further referring to at least one k-th ground truth corresponding to the k-th task specific output, and (ii) at least one (2_k)-th error is maximized which is at least one k-th obfuscated training data score corresponding to k-th obfuscated training data xk' inputted into a (k_1)-st learned discriminator D(k_1), to thereby allow the (k_1)-st learned obfuscation network O(k_1) to be the k-th learned obfuscation network Ok. And the learning device 100 may learn the (k_1)-st learned discriminator D(k_1), such that at least one k-th modified training data score or at least one k-th modified obfuscated training data score is maximized which corresponds to the modified training data or the modified obfuscated training data inputted into the (k_1)-st learned discriminator D(k_1) and that at least one k-th obfuscated training data score is minimized, to thereby allow the (k_1)-st learned discriminator D(k_1) to be a k-th learned discriminator Dk.

Figure 6:
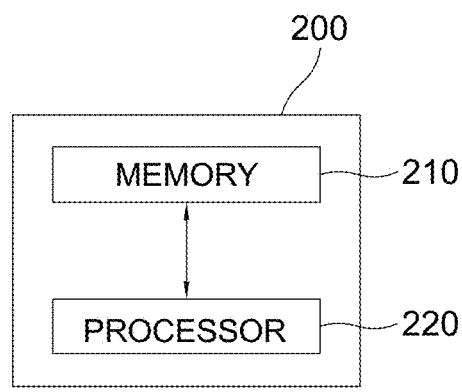
FIG. 6 is a drawing schematically illustrating a testing device for testing a learned obfuscation network in accordance with one example embodiment of the present disclosure.

FIG. 6 is a drawing schematically illustrating a testing device for testing a learned obfuscation network O in accordance with one example embodiment of the present disclosure. By referring to FIG. 6, the testing device 200 in accordance with one example embodiment of the present disclosure may include a memory 210 for storing instructions to test the learned obfuscation network which has been learned to obfuscate test data such that the learning network outputs a result, calculated by using the obfuscated test data, same or similar to a result calculated by using the test data, and a processor 220 for performing processes to test the learned obfuscation network according to the instructions in the memory 210.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, on condition that the learning device (i) has inputted the training data into the obfuscation network, and has allowed the obfuscation network to obfuscate the training data and thus to generate the obfuscated training data, (ii) has inputted the obfuscated training data into the learning network having its own learned parameters, and has allowed the learning network to apply a network operation to the obfuscated training data using the learned parameters and thus to generate the 1-st characteristic information corresponding to the obfuscated training data, and has inputted the training data into the learning network, and has allowed the learning network to apply a network operation to the training data using the learned parameters and thus to output the 2-nd characteristic information corresponding to the training data, and (iii) has learned the obfuscation network, such that the 1-st error is minimized which is calculated by referring to at least part of (iii-1) the (1-1)-st error acquired by referring to the 1-st characteristic information and the 2-st characteristic information and (iii-2) the (1-2)-nd error acquired by referring to the task specific output generated by using the 1-st characteristic information and by further referring to the ground truth corresponding to the task specific output and such that the 2-nd error is maximized which is acquired by referring to the the training data and the obfuscated training data, then if the test data is acquired, according to the instructions stored in the memory 210, the processor 220 may input the test data into the obfuscation network, and allow the obfuscation network to obfuscate the test data using the learned parameters of the obfuscation network and thus to output the obfuscated test data, and thus acquire the obfuscated test data as the obfuscated test data.

Also, on condition that the learning device (i) has inputted the training data into the obfuscation network, and has allowed the obfuscation network to obfuscate the training data to generate the obfuscated training data, (ii) has inputted the obfuscated training data into the learning network having its own learned parameters, and has allowed the learning network to apply a network operation to the obfuscated training data using the learned parameters and thus to generate the 1-st characteristic information corresponding to the obfuscated training data, and has inputted the training data into the learning network, and has allowed the learning network to apply a network operation to the training data using the learned parameters and thus to output the 2-nd characteristic information corresponding to the training data, (iii) has learned the obfuscation network, such that the 1-st error is minimized which is calculated by referring to at least part of (iii-1) the (1-1)-st error acquired by referring to the 1-st characteristic information and the 2-st characteristic information and (iii-2) the (1-2)-nd error acquired by referring to the task specific output generated by using the 1-st characteristic information and by further referring to the ground truth corresponding to the task specific output and such that the 2-nd error is maximized which is the obfuscated training data score corresponding to the obfuscated training data inputted into the discriminator for determining whether inputted data is real or fake, and (iv) has learned the discriminator such that the modified training data score or the modified obfuscated training data score is maximized which corresponds to the modified training data or the modified obfuscated training data inputted into the discriminator and such that the obfuscated training data score is minimized, then if the test data is acquired, according to the instructions stored in the memory 210, the processor 220 may input the test data into the obfuscation network, and allow the obfuscation network to obfuscate the test data using the learned parameters of the obfuscation network and thus to output the obfuscated test data, and thus acquire the obfuscated test data as the obfuscated test data.

Figure 7:
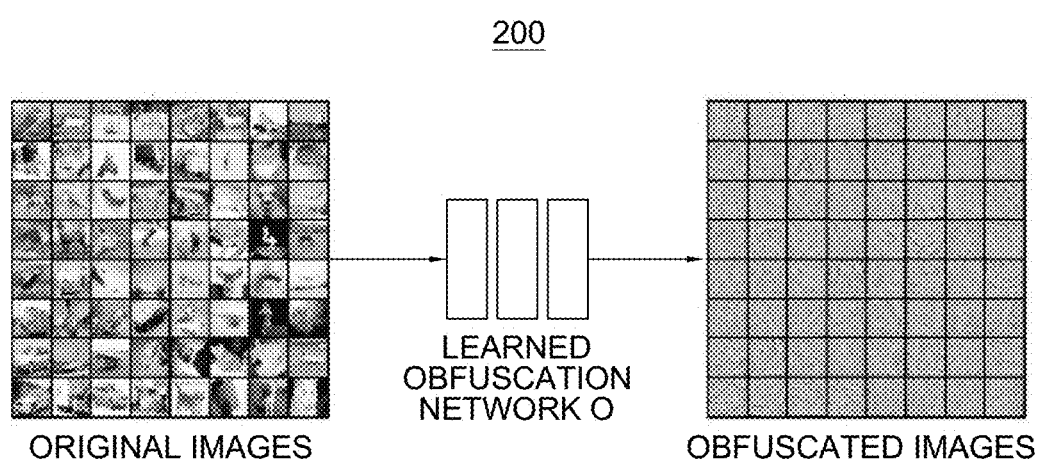
FIG. 7 is a drawing schematically illustrating a testing method for testing the learned obfuscation network in accordance with one example embodiment of the present disclosure.

FIG. 7 is a drawing schematically illustrating a testing method for testing the learned obfuscation network in accordance with one example embodiment of the present disclosure.

By referring to FIG. 7, the testing device 200 may input the test data, for example, original images on a left side of FIG. 7, into the obfuscation network O which has been learned to obfuscate the original data such that the learning network outputs a result, generated by using the obfuscated data, same or similar to a result generated by using the original data, and allow the obfuscation network O to obfuscate the test data according to the learned parameters and thus to output the obfuscated test data, e.g., obfuscated images on a right side of FIG. 7.

For reference, the left side of FIG. 7 represents a drawing exemplarily illustrating 64 image samples selected from the CIFAR-10 dataset which includes images collected and labeled by Canadian Institute for Advanced Research (CI-FAR) for image classification.

The obfuscated data generated by concealing the image samples, as the original data on the left side of FIG. 7 in accordance with the present disclosure, are shown on the right side of FIG. 7.

By referring to FIG. 7, the 64 obfuscated data on the right side of FIG. 7 which are concealed in accordance with the present disclosure are visually different from the 64 original data on the left side of FIG. 7, but if the 64 obfuscated data are inputted into the learning network, the learning network outputs a result same or similar to that of the original data.

Meanwhile, the learned obfuscation network O may have been learned beforehand by processes similar to those in description of FIGS. 2 to 5.

That is, the learning device may (i) have inputted the training data into the obfuscation network, and have allowed the obfuscation network to obfuscate the training data to generate the obfuscated training data, (ii) have inputted the obfuscated training data into the learning network having its own learned parameters, and have allowed the learning network to apply a network operation to the obfuscated training data using the learned parameters and thus to generate the 1-st characteristic information corresponding to the obfuscated training data, and have inputted the training data into the learning network, and have allowed the learning network to apply a network operation to the training data using the learned parameters and thus to output the 2-nd characteristic information corresponding to the training data, and (iii) have learned the obfuscation network O, such that the 1-st error is minimized which is calculated by referring to at least part of (iii-1) the (1-1)-st error acquired by referring to the 1-st characteristic information and the 2-st characteristic information and (iii-2) the (1-2)-nd error acquired by referring to the task specific output generated by using the 1-st characteristic information and by further referring to the ground truth corresponding to the task specific output and such that the 2-nd error is maximized which is acquired by referring to the the training data and the obfuscated training data.

Also, in the above description, the learning network may include the 1-st learning network to the n-th learning network respectively having the 1-st learned parameters to the n-th learned parameters, and the learning device may (i) have inputted the obfuscated training data into each of the 1-st learning network to the n-th learning network, and have allowed each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of the (1_1)-st characteristic information to the (1_n)-th characteristic information on the obfuscated training data, and (ii) have inputted the training data into each of the 1-st learning network to the n-th learning network, and have allowed each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of the (2_1)-st characteristic information to the (2_n)-th characteristic information on the training data, and (iii) have learned the obfuscation network such that (iii-1) the 1-st error is minimized which is calculated by referring to at least part of (iii-1a) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is calculated by referring to the training data and the obfuscated training data.

And, the learning device may (i) have inputted the training data into the obfuscation network, and have allowed the obfuscation network to obfuscate the training data to generate the obfuscated training data, (ii) have inputted the obfuscated training data into the learning network having its own learned parameters, and have allowed the learning network to apply a network operation to the obfuscated training data using the learned parameters and thus to generate the 1-st characteristic information corresponding to the obfuscated training data, and have inputted the training data into the learning network, and have allowed the learning network to apply a network operation to the training data using the learned parameters and thus to output the 2-nd characteristic information corresponding to the training data, (iii) have learned the obfuscation network O such that the 1-st error is minimized which is calculated by referring to at least part of (i-1) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (i-2) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and such that the 2-nd error is maximized which is the obfuscated training data score corresponding to the obfuscated training data inputted into the discriminator for determining whether the inputted data is real or fake, and (iv) have learned the discriminator such that the modified training data score or the modified obfuscated training data score corresponding to the modified training data or the modified obfuscated training data inputted into the discriminator is maximized and that the obfuscated training data score is minimized.

Also, in the above description, the learning network may include the 1-st learning network to the n-th learning network respectively having the 1-st learned parameters to the n-th learned parameters, and the learning device may (i) have inputted the obfuscated training data into each of the 1-st learning network to the n-th learning network, and have allowed each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of the (1_1)-st characteristic information to the (1_n)-th characteristic information on the obfuscated training data, and (ii) have inputted the training data into each of the 1-st learning network to the n-th learning network, and have allowed each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of the (2_1)-st characteristic information to the (2_n)-th characteristic information on the training data, (iii) have learned the obfuscation network such that (iii-1) the 1-st error is minimized which is calculated by referring to at least part of (iii-1a) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is the obfuscated training data score corresponding to the obfuscated training data inputted into the discriminator, and (iv) have learned the discriminator such that the modified training data score or the modified obfuscated training data score is maximized which corresponds to the modified training data or the modified obfuscated training data inputted into the discriminator and such that the obfuscated training data score is minimized.

Meanwhile, the obfuscated data which are concealed by the learned obfuscation network in accordance with the present disclosure may be provided or sold to a buyer of image big data.

Also, in accordance with the present disclosure, when the concealed image data are provided or sold to the buyer, the testing method of the learned obfuscation network may be provided as implemented in a form of program instructions executable by a variety of computer components and recorded to computer readable media. In accordance with one example embodiment of the present disclosure, the buyer may execute the program instructions recorded in the computer readable media by using the computer devices, to thereby generate concealed data from the original data owned by the buyer or acquired from other sources, and use the concealed data for his/her own learning network. Also, the buyer may use at least two of the concealed data, the original image data owned by the buyer or acquired from other sources, and the concealed image data provided or sold to the buyer, together for the buyer's learning network.

Meanwhile, in accordance with the present disclosure, if the testing method of the learned obfuscation network is implemented as the program instructions that can be executed by a variety of computer components, then computational overhead may occur in the computing devices of the buyer when the accuracy is set as high, thus the buyer is allowed to lower the accuracy to prevent the computational overhead.

Meanwhile, the "average" mentioned in this specification may represent a weighted average but it is not limited thereto.

The present disclosure has an effect of performing concealment in a simple and accurate way, since processes of finding personal identification information in data are eliminated.

The present disclosure has another effect of protecting privacy and security of the original data by generating irreversibly obfuscated and concealed data from the original data.

The present disclosure has still another effect of generating data recognized as similar or same by a computer but recognized as different by a human.

The present disclosure has still yet another effect of stimulating a big data trade market.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning an obfuscation network used for concealing original data to protect personal information, comprising steps of:

(a) a learning device, when training data is acquired, inputting the training data into an obfuscation network and instructing the obfuscation network to obfuscate the training data and thus to generate obfuscated training data;

(b) the learning device (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data; and (c) the learning device learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein the learning network includes a 1-st learning network to an n-th learning network respectively having one or more 1-st learned parameters to one or more n-th learned parameters wherein n is an integer greater than 0, wherein, at the step of (b), the learning device (i) inputs the obfuscated training data into each of the 1-st learning network to the n-th learning network, and allows each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputs the training data into each of the 1-st learning network to the n-th learning network, and allows each of the 1-st learning network to the n-th learning network to (ii-1) apply its corresponding network operation to the training data using respectively the 1-st learned parameters to the n-th learned parameters, and thus to (ii-2) output each piece of (2_1)-st characteristic information to (2_n)-th characteristic information on the training data, and wherein, at the step of (c), the learning device learns the obfuscation network including (i) the 1-st error is minimized which is calculated by referring to at least part of (i-1) the (1_1)-st error which is an average over a (1_1)_1-st error to a (1_1)_n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (i-2) the (1_2)-nd error which is an average over a (1_2)_1-st error to a (1_2)_n-th error wherein the (1_2)_1-st error is acquired by referring to (i-2a) at least one 1-st task specific output created by using the (1_1)-st characteristic information and (i-2b) at least one 1-st ground truth corresponding to the 1-st task specific output, and the (1_2)_n-th error is acquired by referring to (i-2a) at least one n-th task specific output created by using the (1_n)-th characteristic information and (i-2b) at least one n-th ground truth corresponding to the n-th task specific output, and (ii) the 2-nd error is maximized which is calculated by referring to the training data and the obfuscated training data.

2. A method for learning an obfuscation network used for concealing original data to protect personal information, comprising steps of:
(a) a learning device, when training data is acquired, inputting the training data into an obfuscation network and instructing the obfuscation network to obfuscate the training data and thus to generate obfuscated training data;
(b) the learning device (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data; and
(c) the learning device learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein the learning network includes a 1-st learning network to an n-th learning network respectively having one or more 1-st learned parameters to one or more n-th learned parameters wherein n is an integer greater than 0, wherein, at the step of (a), the learning device inputs the training data into the obfuscation network, and allows the obfuscation network to obfuscate the training data and thus to generate 1-st obfuscated training data, wherein, at the step of (b), the learning device (i) inputs the 1-st obfuscated training data into the 1-st learning network, and allows the 1-st learning network to (i-1) apply a network operation to the 1-st obfuscated training data using the 1-st learned parameters of the 1-st learning network and thus to (i-2) output (1_1)-st characteristic information on the 1-st obfuscated training data, and (ii) inputs the training data into the 1-st learning network, and allows the 1-st learning network to (ii-1) apply a network operation to the training data using the 1-st learned parameters and thus to (ii-2) output (2_1)-st characteristic information on the training data, wherein, at the step of (c), the learning device learns the obfuscation network, including (i) at least one (1_1)-st error is minimized which is calculated by referring to at least part of (i-1) at least one (1_1)_1-st error acquired by referring to the (1_1)-st characteristic information and the (2_1)-st characteristic information, and (i-2) at least one (1_2)_1-st error acquired by referring to (i-2a) at least one 1-st task specific output generated by using the (1_1)-st characteristic information and (i-2b) at least one 1-st ground truth corresponding to the 1-st task specific output, and (ii) at least one (2_1)-st error is maximized which is calculated by referring to the training data and the 1-st obfuscated training data, to thereby allow the obfuscation network to be a 1-st learned obfuscation network, and wherein, while increasing an integer k from 2 to n, the learning device (i) inputs the training data into the (k_1)-st learned obfuscation network, and allows the (k_1)-st learned obfuscation network to obfuscate the training data to generate k-th obfuscated training data, (ii) (ii-1) inputs the k-th obfuscated training data into a k-th learning network, and allows the k-th learning network to apply a network operation to the k-th obfuscated training data using one or more k-th learned parameters of the k-th learning network and thus to output (1_k)-th characteristic information on the k-th obfuscated training data, and (ii-2) inputs the training data into the k-th learning network, and allows the k-th learning network to apply a network operation to the training data using the k-th learned parameters and thus to output (2_k)-th characteristic information on the training data, and (iii) learns the (k_1)-st learned obfuscation network, including (iii-1) at least one (1_k)-th error is minimized which is calculated by referring to at least part of (iii-1a) at least one (1_1) k-th error acquired by referring to the (1_k)-th characteristic information and the (2_k)-th characteristic information and (iii-1b) at least one (1_2) k-th error acquired by referring to at least one k-th task specific output created by using the (1_k)-th characteristic information and by further referring to at least one k-th ground truth corresponding to the k-th task specific output, and (iii-2) at least one (2_k)-th error is maximized which is calculated by referring to the training data and the k-th obfuscated training data, to thereby allow the (k_1)-st learned obfuscation network to be a k-th learned obfuscation network.

3. A method for learning an obfuscation network used for concealing original data to protect personal information, comprising steps of:
(a) a learning device, when training data is acquired, inputting the training data into an obfuscation network and instructing the obfuscation network to obfuscate the training data and thus to generate obfuscated training data;
- (b) the learning device (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data; and
- (c) the learning device learning the obfuscation network including (i) at least one 1-st error is minimized which is calculated by referring to at least part of (i-1) at least one $(1\_1)$-st error acquired by referring to the 1-st characteristic information and the 2-nd characteristic information, and (i-2) at least one $(1\_2)$-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein, at the step of (c), on condition that at least one obfuscated training data score has been acquired as the 2-nd error which corresponds to the obfuscated training data inputted into a discriminator for determining whether inputted data is real or fake, the learning device (i) learns the obfuscation network including the 1-st error is minimized and that the 2-nd error is maximized, and (ii) learns the discriminator including at least one modified training data score or at least one modified obfuscated training data score corresponding to modified training data or modified obfuscated training data inputted into the discriminator is maximized and that the obfuscated training data score is minimized wherein the modified training data or the modified obfuscated training data is generated respectively by modifying the training data or the obfuscated training data.

4. The method of claim 3, wherein the learning network includes a 1-st learning network to an n-th learning network respectively having one or more 1-st learned parameters to one or more n-th learned parameters wherein n is an integer greater than 0, wherein, at the step of (b), the learning device (i) inputs the obfuscated training data into each of the 1-st learning network to the n-th learning network, and allows each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of $(1\_1)$-st characteristic information to $(1\_n)$-th characteristic information on the obfuscated training data, and (ii) inputs the training data into each of the 1-st learning network to the n-th learning network, and allows each of the 1-st learning network to the n-th learning network to (ii-1) apply its corresponding network operation to the training data using respectively the 1-st learned parameters to the n-th learned parameters, and thus to (ii-2) output each piece of $(2\_1)$-st characteristic information to $(2\_n)$-th characteristic information on the training data, and wherein, at the step of (c), the learning device (i) learns the obfuscation network including the 1-st error is minimized which is calculated by referring to at least part of (i-1) the $(1\_1)$-st error which is an average over a $(1\_1)\_1$-st error to a $(1\_1)\_n$-th error wherein the $(1\_1)\_1$-st error is acquired by referring to the $(1\_1)$-st characteristic information and the $(2\_1)$-st characteristic information and the $(1\_1)\_n$-th error is acquired by referring to the $(1\_n)$-th characteristic information and the $(2\_n)$-th characteristic information, and (i-2) the $(1\_2)$-nd error which is an average over a $(1\_2)\_1$-st error to a $(1\_2)\_n$-th error wherein the $(1\_2)\_1$-st error is acquired by referring to (i-2a) at least one 1-st task specific output created by using the $(1\_1)$-st characteristic information and (i-2b) at least one 1-st ground truth corresponding to the 1-st task specific output, and the $(1\_2)\_n$-th error is acquired by referring to (i-2a) at least one n-th task specific output created by using the $(1\_n)$-th characteristic information and (i-2b) at least one n-th ground truth corresponding to the n-th task specific output, and including the 2-nd error is maximized which is the obfuscated training data score corresponding to the obfuscated training data inputted into the discriminator, and (ii) learns the discriminator including the modified training data score or the modified obfuscated training data score corresponding to the modified training data or the modified obfuscated training data inputted into the discriminator is maximized and that the obfuscated training data score is minimized.

5. The method of claim 3, wherein the learning network includes a 1-st learning network to an n-th learning network respectively having one or more 1-st learned parameters to one or more n-th learned parameters wherein n is an integer greater than 0, wherein, at the step of (a), the learning device inputs the training data into the obfuscation network, and allows the obfuscation network to obfuscate the training data and thus to generate 1-st obfuscated training data, wherein, at the step of (b), the learning device (i) inputs the 1-st obfuscated training data into the 1-st learning network, and allows the 1-st learning network to (i-1) apply a network operation to the 1-st obfuscated training data using the 1-st learned parameters of the 1-st learning network and thus to (i-2) output $(1\_1)$-st characteristic information on the 1-st obfuscated training data, and (ii) inputs the training data into the 1-st learning network, and allows the 1-st learning network to (ii-1) apply a network operation to the training data using the 1-st learned parameters and thus to (ii-2) output $(2\_1)$-st characteristic information on the training data, wherein, at the step of (c), the learning device learns the obfuscation network, including (i) at least one $(1\_1)$-st error is minimized which is calculated by referring to at least part of (i-1) at least one $(1\_1)\_1$-st error acquired by referring to the $(1\_1)$-st characteristic information and the $(2\_1)$-st characteristic information, and (i-2) at least one $(1\_2)\_1$-st error acquired by referring to (i-2a) at least one 1-st task specific output generated by using the $(1\_1)$-st characteristic information and (i-2b) at least one 1-st ground truth corresponding to the 1-st task specific output, and (ii) at least one $(2\_1)$-st error is maximized which is at least one 1-st obfuscated training data score corresponding to the 1-st obfuscated training data inputted into the discriminator, to thereby allow the obfuscation network to be a 1-st learned obfuscation network, and the learning device learns the discriminator, including (i) at least one 1-st modified training data score or at least one 1-st modified obfuscated training data score is maximized which corresponds to the modified training data or the modified obfuscated training data inputted into the discriminator, and (ii) the 1-st obfuscated training data score is minimized, to thereby allow the discriminator to be a 1-st learned discriminator, and wherein, while increasing an integer k from 2 to n, the learning device (i) inputs the training data into the (k_1)-st learned obfuscation network, and allows the (k_1)-st learned obfuscation network to obfuscate the training data to generate k-th obfuscated training data, (ii) (ii-1) inputs the k-th obfuscated training data into a k-th learning network, and allows the k-th learning network to apply a network operation to the k-th obfuscated training data using one or more k-th learned parameters of the k-th learning network and thus to output (1_k)-th characteristic information on the k-th obfuscated training data, and (ii-2) inputs the training data into the k-th learning network, and allows the k-th learning network to apply a network operation to the training data using the k-th learned parameters and thus to output (2_k)-th characteristic information on the training data, (iii) learns a (k_1)-st learned obfuscation network, including at least one (1_k)-th error is minimized which is calculated by referring to at least part of (iii-1) at least one (1-1)_k-th error acquired by referring to the (1_k)-th characteristic information and the (2_k)-th characteristic information and (iii-2) at least one (1-2)_k-th error acquired by referring to at least one k-th task specific output generated by using the (1_k)-th characteristic information and by further referring to at least one k-th ground truth corresponding to the k-th task specific output and at least one (2_k)-th error is maximized which is at least one k-th obfuscated training data score corresponding to the k-th obfuscated training data inputted into the (k_1)-st learned discriminator, to thereby allow the (k_1)-st learned obfuscation network to be a k-th learned obfuscation network, and (iv) learns the (k_1)-st learned discriminator, including at least one k-th modified training data score or at least one k-th modified obfuscated training data score corresponding to the modified training data or the modified obfuscated training data inputted into the (k_1)-st learned discriminator is maximized and the k-th obfuscated training data score is minimized, to thereby allow the (k_1)-st learned discriminator to be a k-th learned discriminator.

6. The method of claim 3, wherein a maximum of the modified training data score or the modified obfuscated training data score respectively corresponding to the modified training data or the modified obfuscated training data inputted into the discriminator is 1 as a value for determining the modified training data or the modified obfuscated training data as real, and a minimum of the obfuscated training data score corresponding to the obfuscated training data inputted into the discriminator is 0 as a value for determining the obfuscated training data as fake.

7. A method for learning an obfuscation network used for concealing original data to protect personal information, comprising steps of:

(a) a learning device, when training data is acquired, inputting the training data into an obfuscation network and instructing the obfuscation network to obfuscate the training data and thus to generate obfuscated training data;

(b) the learning device (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data; and (c) the learning device learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein, at the step of (c), the learning device acquires the 1-st error by referring to at least part of (i) difference between the 1-st characteristic information and the 2-nd characteristic information and (ii) at least one difference between the task specific output and the ground truth, and acquires the 2-nd error by referring to at least one difference between the training data and the obfuscated training data.

8. The method of claim 7, wherein the learning device acquires the 1-st error by referring to a norm or a cosine similarity between the 1-st characteristic information and the 2-nd characteristic information.

9. A method for learning an obfuscation network used for concealing original data to protect personal information, comprising steps of:

(a) a learning device, when training data is acquired, inputting the training data into an obfuscation network and instructing the obfuscation network to obfuscate the training data and thus to generate obfuscated training data;

(b) the learning device (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data; and (c) the learning device learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein, at the step of (c), the learning device measures at least one quality by referring to at least part of an entropy and a degree of noise of the obfuscated training data, and acquires the 1-st error by further referring to the measured quality.

10. A testing method for learning an obfuscation network used for concealing original data to protect personal information, comprising steps of:
(a) a testing device performing, on condition that a learning device has performed processes of (i) acquiring and inputting training data into an obfuscation network and instructing the obfuscation network to obfuscate the training data and thus to generate obfuscated training data, (ii) inputting the obfuscated training data into a learning network having its own one or more learned parameters, and allowing the learning network to (ii-1) apply a network operation to the obfuscated training data using the learned parameters and thus to (ii-2) generate 1-st characteristic information corresponding to the obfuscated training data, and (iii) inputting the training data into the learning network, and allowing the learning network to (iii-1) apply a network operation to the training data using the learned parameters and thus to (iii-2) generate 2-nd characteristic information corresponding to the training data, and (iv) learning the obfuscation network including (iv-1) at least one 1-st error is minimized which is calculated by referring to at least part of (iv-1a) at least one (1_1)-st error acquired by referring to the 1-st characteristic information and the 2-nd characteristic information, and (iv-1b) at least one (1_2)-nd error acquired by referring to at least one task specific output generated by using the 1-st characteristic information and by further referring to at least one ground truth corresponding to the task specific output, and (iv-2) at least one 2-nd error is maximized which is calculated by referring to the training data and the obfuscated training data, a process of acquiring test data; and
(b) the testing device performing processes of inputting the test data into the obfuscation network and allowing the obfuscation network to obfuscate the test data using the learned parameters of the obfuscation network, to thereby output obfuscated test data as concealed test data,
wherein, at the step of (a), the learning network includes a 1-st learning network to an n-th learning network respectively having one or more 1-st learned parameters to one or more n-th learned parameters wherein n is an integer greater than 0, and
wherein, the learning device has performed processes of (i) inputting the obfuscated training data into each of the 1-st learning network to the n-th learning network, and allowing each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputting the training data into each of the 1-st learning network to the n-th learning network, and allowing each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of (2_1)-st characteristic information to (2_n)-th characteristic information on the training data, and (iii) learning the obfuscation network including (iii-1) the 1-st error is minimized which is calculated by referring to at least part of (iii-1a) the (1_1)-st error which is an average over a (1_1)_1-st error to a (1_1) n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is calculated by referring to the training data and the obfuscated training data.

11. A testing method for learning an obfuscation network used for concealing original data to protect personal information, comprising steps of:
(a) a testing device performing, on condition that a learning device has performed processes of (i) acquiring and inputting training data into an obfuscation network and instructing the obfuscation network to obfuscate the training data and thus to generate obfuscated training data, (ii) inputting the obfuscated training data into a learning network having its own one or more learned parameters, and allowing the learning network to (ii-1) apply a network operation to the obfuscated training data using the learned parameters and thus to (ii-2) generate 1-st characteristic information corresponding to the obfuscated training data, and (iii) inputting the training data into the learning network, and allowing the learning network to (iii-1) apply a network operation to the training data using the learned parameters and thus to (iii-2) generate 2-nd characteristic information corresponding to the training data, and (iv) learning the obfuscation network including (iv-1) at least one 1-st error is minimized which is calculated by referring to at least part of (iv-1a) at least one (1_1)-st error acquired by referring to the 1-st characteristic information and the 2-nd characteristic information, and (iv-1b) at least one (1_2)-nd error acquired by referring to at least one task specific output generated by using the 1-st characteristic information and by further referring to at least one ground truth corresponding to the task specific output, and (iv-2) at least one 2-nd error is maximized which is calculated by referring to the training data and the obfuscated training data, a process of acquiring test data; and (b) the testing device performing processes of inputting the test data into the obfuscation network and allowing the obfuscation network to obfuscate the test data using the learned parameters of the obfuscation network, to thereby output obfuscated test data as concealed test data, wherein, at the step of (a), the learning device (i) has acquired at least one obfuscated training data score as the 2-nd error which corresponds to the obfuscated training data inputted into a discriminator for determining whether inputted data is real or fake, (ii) has learned the obfuscation network including the 1-st error is minimized and that the 2-nd error is maximized, and (iii) has learned the discriminator including at least one modified training data score or at least one modified obfuscated training data score respectively corresponding to modified training data or modified obfuscated training data inputted into the discriminator is maximized and that the obfuscated training data score is minimized wherein the modified training data or the modified obfuscated training data is generated respectively by modifying the training data or the obfuscated training data.

12. The method of claim 11, wherein, at the step of (a), the learning network includes a 1-st learning network to an n-th learning network respectively having one or more 1-st learned parameters to one or more n-th learned parameters wherein n is an integer greater than 0, and wherein, the learning device has performed processes of (i) inputting the obfuscated training data into each of the 1-st learning network to the n-th learning network, and allowing each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputting the training data into each of the 1-st learning network to the n-th learning network, and allowing each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of (2_1)-st characteristic information to (2_n)-th characteristic information on the training data, (iii) learning the obfuscation network including (iii-1) the 1-st error is minimized which is calculated by referring to at least part of (iii-1a) the (1_1)-st error which is an average over a (1_1)_1-st error to a (1_1)_n-th error wherein the (1_1)_1-st error is acquired by referring to the (1_1)-st characteristic information and the (2_1)-st characteristic information, and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is the obfuscated training data score corresponding to the modified training data inputted into the discriminator, and (iv) learning the discriminator including the modified training data score or the modified obfuscated training data score is maximized which respectively corresponds to the modified training data or the modified obfuscated training data inputted into the discriminator, and that the modified training data score is minimized.

13. A learning device for learning an obfuscation network used for concealing original data to protect personal information, comprising:

at least one memory that stores instructions; and at least one processor configured to execute the instructions to perform or support another device to perform processes of: (I) when training data is acquired, inputting the training data into an obfuscation network and instructing the obfuscation network to obfuscate the training data and thus to generate obfuscated training data, (II) (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data, and (III) learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein the learning network includes a 1-st learning network to an n-th learning network respectively having one or more 1-st learned parameters to one or more n-th learned parameters wherein n is an integer greater than 0, wherein, at the process of (II), the processor (i) inputs the obfuscated training data into each of the 1-st learning network to the n-th learning network, and allows each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputs the training data into each of the 1-st learning network to the n-th learning network, and allows each of the 1-st learning network to the n-th learning network to (ii-1) apply its corresponding network operation to the training data using respectively the 1-st learned parameters to the n-th learned parameters, and thus to (ii-2) output each piece of (2_1)-st characteristic information to (2_n)-th characteristic information on the training data, and wherein, at the process of (III), the processor learns the obfuscation network including (i) the 1-st error is minimized which is calculated by referring to at least part of (i-1) the (1_1)-st error which is an average over a (1_1)_1-st error to a (1_1) n-th error wherein the (1_1)_1-st error is acquired by referring to the (1_1)-st characteristic information and the (2_1)-st characteristic information and the (1_1) n-th error is acquired by referring to the (1_n)-th characteristic information and the (2_n)-th characteristic information, and (i-2) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (ii) the 2-nd error is maximized which is calculated by referring to the training data and the obfuscated training data.

14. A learning device for learning an obfuscation network used for concealing original data to protect personal information, comprising:

at least one memory that stores instructions; and at least one processor configured to execute the instructions to perform or support another device to perform processes of: (I) when training data is acquired, inputting the training data into an obfuscation network and instructing the obfuscation network to obfuscate the training data and thus to generate obfuscated training data, (II) (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data, and (III) learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein the learning network includes a 1-st learning network to an n-th learning network respectively having one or more 1-st learned parameters to one or more n-th learned parameters wherein n is an integer greater than 0, wherein, at the process of (I), the processor inputs the training data into the obfuscation network, and allows the obfuscation network to obfuscate the training data and thus to generate 1-st obfuscated training data, wherein, at the process of (II), the processor (i) inputs the 1-st obfuscated training data into the 1-st learning network, and allows the 1-st learning network to (i-1) apply a network operation to the 1-st obfuscated training data using the 1-st learned parameters of the 1-st learning network and thus to (i-2) output (1_1)-st characteristic information on the 1-st obfuscated training data, and (ii) inputs the training data into the 1-st learning network, and allows the 1-st learning network to (ii-1) apply a network operation to the training data using the 1-st learned parameters and thus to (ii-2) output (2_1)-st characteristic information on the training data, wherein, at the process of (III), the processor learns the obfuscation network, including (i) at least one (1_1)-st error is minimized which is calculated by referring to at least part of (i-1) at least one (1_1)_1-st error acquired by referring to the (1_1)-st characteristic information and the (2_1)-st characteristic information, and (i-2) at least one (1_2)_1-st error acquired by referring to at least one 1-st task specific output generated by using the (1_1)-st characteristic information and by further referring to at least one 1-st ground truth corresponding to the 1-st task specific output, and (ii) at least one (2_1)-st error is maximized which is calculated by referring to the training data and the 1-st obfuscated training data, to thereby allow the obfuscation network to be a 1-st learned obfuscation network, and wherein, while increasing an integer k from 2 to n, the processor (i) inputs the training data into the (k_1)-st learned obfuscation network, and allows the (k_1)-st learned obfuscation network to obfuscate the training data to generate k-th obfuscated training data, (ii) (ii-1) inputs the k-th obfuscated training data into a k-th learning network, and allows the k-th learning network to apply a network operation to the k-th obfuscated training data using one or more k-th learned parameters of the k-th learning network and thus to output (1_k)-th characteristic information on the k-th obfuscated training data, and (ii-2) inputs the training data into the k-th learning network, and allows the k-th learning network to apply a network operation to the training data using the k-th learned parameters and thus to output (2_k)-th characteristic information on the training data, and (iii) learns the (k_1)-st learned obfuscation network, including (iii-1) at least one (1_k)-th error is minimized which is calculated by referring to at least part of (iii-1a) at least one (1_1) k-th error acquired by referring to the (1_k)-th characteristic information and the (2_k)-th characteristic information and (iii-1b) at least one (1_2) k-th error acquired by referring to at least one k-th task specific output created by using the (1_k)-th characteristic information and by further referring to at least one k-th ground truth corresponding to the k-th task specific output, and (iii-2) at least one (2_k)-th error is maximized which is calculated by referring to the training data and the k-th obfuscated training data, to thereby allow the (k_1)-st learned obfuscation network to be a k-th learned obfuscation network.

15. A learning device for learning an obfuscation network used for concealing original data to protect personal information, comprising:

at least one memory that stores instructions; and at least one processor configured to execute the instructions to perform or support another device to perform processes of: (I) when training data is acquired, inputting the training data into an obfuscation network and instructing the obfuscation network to obfuscate the training data and thus to generate obfuscated training data, (II) (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data, and (III) learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein, at the process of (III), on condition that at least one obfuscated training data score has been acquired as the 2-nd error which corresponds to the obfuscated training data inputted into a discriminator for determining whether inputted data is real or fake, the processor (i) learns the obfuscation network including the 1-st error is minimized and that the 2-nd error is maximized, and (ii) learns the discriminator including at least one modified training data score or at least one modified obfuscated training data score respectively corresponding to modified training data or modified obfuscated training data inputted into the discriminator is maximized and that the obfuscated training data score is minimized wherein the modified training data or the modified obfuscated training data is generated respectively by modifying the training data or the obfuscated training data.

16. The learning device of claim 15, wherein the learning network includes a 1-st learning network to an n-th learning network respectively having one or more 1-st learned parameters to one or more n-th learned parameters wherein n is an integer greater than 0, wherein, at the process of (II), the processor (i) inputs the obfuscated training data into each of the 1-st learning network to the n-th learning network, and allows each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputs the training data into each of the 1-st learning network to the n-th learning network, and allows each of the 1-st learning network to the n-th learning network to (ii-1) apply its corresponding network operation to the training data using respectively the 1-st learned parameters to the n-th learned parameters, and thus to (ii-2) output each piece of (2_1)-st characteristic information to (2_n)-th characteristic information on the training data, and wherein, at the process of (III), the processor (i) learns the obfuscation network including the 1-st error is minimized which is calculated by referring to at least part of (i-1) the (1_1)-st error which is an average over a (1_1)_1-st error to a (1_1) n-th error wherein the (1_1)_1-st error is acquired by referring to the (1_1)-st characteristic information and the (2_1)-st characteristic information and the (1_1) n-th error is acquired by referring to the (1_n)-th characteristic information and the (2_n)-th characteristic information, and (i-2) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and the 2-nd error is maximized which is the obfuscated training data score corresponding to the obfuscated training data inputted into the discriminator, and (ii) learns the discriminator including the modified training data score or the modified obfuscated training data score respectively corresponding to the modified training data or the modified obfuscated training data inputted into the discriminator is maximized and that the obfuscated training data score is minimized.

17. The learning device of claim 15, wherein the learning network includes a 1-st learning network to an n-th learning network respectively having one or more 1-st learned parameters to one or more n-th learned parameters wherein n is an integer greater than 0, wherein, at the process of (I), the processor inputs the training data into the obfuscation network, and allows the obfuscation network to obfuscate the training data and thus to generate 1-st obfuscated training data, wherein, at the process of (II), the processor (i) inputs the 1-st obfuscated training data into the 1-st learning network, and allows the 1-st learning network to (i-1) apply a network operation to the 1-st obfuscated training data using the 1-st learned parameters of the 1-st learning network and thus to (i-2) output (1_1)-st characteristic information on the 1-st obfuscated training data, and (ii) inputs the training data into the 1-st learning network, and allows the 1-st learning network to (ii-1) apply a network operation to the training data using the 1-st learned parameters and thus to (ii-2) output (2_1)-st characteristic information on the training data, wherein, at the process of (III), the processor learns the obfuscation network, including (i) at least one (1_1)-st error is minimized which is calculated by referring to at least part of (i-1) at least one (1_1)_1-st error acquired by referring to the (1_1)-st characteristic information and the (2_1)-st characteristic information, and (i-2) at least one (1_2)_1-st error acquired by referring to (i-2a) at least one 1-st task specific output generated by using the (1_1)-st characteristic information and (i-2b) at least one 1-st ground truth corresponding to the 1-st task specific output, and (ii) at least one (2_1)-st error is maximized which is at least one 1-st obfuscated training data score corresponding to the 1-st obfuscated training data inputted into the discriminator, to thereby allow the obfuscation network to be a 1-st learned obfuscation network, and the processor learns the discriminator, including (i) at least one 1-st modified training data score or at least one 1-st modified obfuscated training data score is maximized which corresponds to the modified training data or the modified obfuscated training data inputted into the discriminator, and (ii) the 1-st obfuscated training data score is minimized, to thereby allow the discriminator to be a 1-st learned discriminator, and wherein, while increasing an integer k from 2 to n, the processor (i) inputs the training data into the (k_1)-st learned obfuscation network, and allows the (k_1)-st learned obfuscation network to obfuscate the training data to generate k-th obfuscated training data, (ii) (ii-1) inputs the k-th obfuscated training data into a k-th learning network, and allows the k-th learning network to apply a network operation to the k-th obfuscated training data using one or more k-th learned parameters of the k-th learning network and thus to output (1_k)-th characteristic information on the k-th obfuscated training data, and (ii-2) inputs the training data into the k-th learning network, and allows the k-th learning network to apply a network operation to the training data using the k-th learned parameters and thus to output (2_k)-th characteristic information on the training data, (iii) learns a (k_1)-st learned obfuscation network, including at least one (1_k)-th error is minimized which is calculated by referring to at least part of (iii-1) at least one (1-1) k-th error acquired by referring to the (1_k)-th characteristic information and the (2_k)-th characteristic information and (iii-2) at least one (1-2) k-th error acquired by referring to at least one k-th task specific output generated by using the (1_k)-th characteristic information and by further referring to at least one k-th ground truth corresponding to the k-th task specific output and at least one (2_k)-th error is maximized which is at least one k-th obfuscated training data score corresponding to the k-th obfuscated training data inputted into the (k_1)-st learned discriminator, to thereby allow the (k_1)-st learned obfuscation network to be a k-th learned obfuscation network, and (iv) learns the (k_1)-st learned discriminator, including at least one k-th modified training data score or at least one k-th modified obfuscated training data score corresponding to the modified training data or the modified obfuscated training data inputted into the (k_1)-st learned discriminator is maximized and the k-th obfuscated training data score is minimized, to thereby allow the (k_1)-st learned discriminator to be a k-th learned discriminator.

18. The learning device of claim 15, wherein a maximum of the modified training data score or the modified obfuscated training data score respectively corresponding to the modified training data or the modified obfuscated training data inputted into the discriminator is 1 as a value for determining the modified training data or the modified obfuscated training data as real, and a minimum of the obfuscated training data score corresponding to the obfuscated training data inputted into the discriminator is 0 as a value for determining the obfuscated training data as fake.

19. A learning device for learning an obfuscation network used for concealing original data to protect personal information, comprising:

at least one memory that stores instructions; and at least one processor configured to execute the instructions to perform or support another device to perform processes of: (I) when training data is acquired, inputting the training data into an obfuscation network and instructing the obfuscation network to obfuscate the training data and thus to generate obfuscated training data, (II) (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data, and (III) learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein, at the process of (III), the processor acquires the 1-st error by referring to at least part of (i) difference between the 1-st characteristic information and the 2-nd characteristic information and (ii) at least one difference between the task specific output and the ground truth, and acquires the 2-nd error by referring to at least one difference between the training data and the obfuscated training data.

20. The learning device of claim 19, wherein the processor acquires the 1-st error by referring to a norm or a cosine similarity between the 1-st characteristic information and the 2-nd characteristic information.

21. A learning device for learning an obfuscation network used for concealing original data to protect personal information, comprising:

at least one memory that stores instructions; and at least one processor configured to execute the instructions to perform or support another device to perform processes of: (I) when training data is acquired, inputting the training data into an obfuscation network and instructing the obfuscation network to obfuscate the training data and thus to generate obfuscated training data, (II) (i) inputting the obfuscated training data into a learning network having its own one or more learned parameters, and allowing the learning network to (i-1) apply a network operation to the obfuscated training data using the learned parameters and thus to (i-2) generate 1-st characteristic information corresponding to the obfuscated training data, and (ii) inputting the training data into the learning network, and allowing the learning network to (ii-1) apply a network operation to the training data using the learned parameters and thus to (ii-2) generate 2-nd characteristic information corresponding to the training data, and (III) learning the obfuscation network including (i) at least one 1-st error is minimized which is calculated by referring to at least part of (i-1) at least one (1_1)-st error acquired by referring to the 1-st characteristic information and the 2-nd characteristic information, and (i-2) at least one (1_2)-nd error acquired by referring to at least one task specific output generated by using the 1-st characteristic information and by further referring to at least one ground truth corresponding to the task specific output, and (ii) at least one 2-nd error is maximized which is calculated by referring to the training data and the obfuscated training data, wherein, at the process of (III), the processor measures at least one quality by referring to at least part of an entropy and a degree of noise of the obfuscated training data, and acquires the 1-st error by further referring to the measured quality.

22. A testing device for learning an obfuscation network used for concealing original data to protect personal information, comprising:

at least one memory that stores instructions; and at least one processor configured to execute the instructions to perform or support another device to perform processes of: (I) on condition that a learning device has performed processes of (i) acquiring and inputting training data into an obfuscation network and instructing the obfuscation network to obfuscate the training data and thus to generate obfuscated training data, (ii) inputting the obfuscated training data into a learning network having its own one or more learned parameters, and allowing the learning network to (ii-1) apply a network operation to the obfuscated training data using the learned parameters and thus to (ii-2) generate 1-st characteristic information corresponding to the obfuscated training data, and (iii) inputting the training data into the learning network, and allowing the learning network to (iii-1) apply a network operation to the training data using the learned parameters and thus to (iii-2) generate 2-nd characteristic information corresponding to the training data, and (iv) learning the obfuscation network including (iv-1) at least one 1-st error is minimized which is calculated by referring to at least part of (iv-1a) at least one (1_1)-st error acquired by referring to the 1-st characteristic information and the 2-nd characteristic information, and (iv-1b) at least one (1_2)-nd error acquired by referring to at least one task specific output generated by using the 1-st characteristic information and by further referring to at least one ground truth corresponding to the task specific output, and (iv-2) at least one 2-nd error is maximized which is calculated by referring to the training data and the obfuscated training data, performing a process of acquiring test data, and (II) inputting the test data into the obfuscation network and allowing the obfuscation network to obfuscate the test data using the learned parameters of the obfuscation network, to thereby output obfuscated test data as concealed test data, wherein, at the process of (I), the learning network includes a 1-st learning network to an n-th learning network respectively having one or more 1-st learned parameters to one or more n-th learned parameters wherein n is an integer greater than 0, and wherein, the learning device has performed processes of (i) inputting the obfuscated training data into each of the 1-st learning network to the n-th learning network, and allowing each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputting the training data into each of the 1-st learning network to the n-th learning network, and allowing each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of (2_1)-st characteristic information to (2_n)-th characteristic information on the training data, and (iii) learning the obfuscation network including (iii-1) the 1-st error is minimized which is calculated by referring to at least part of (iii-1a) the (1_1)-st error which is an average over a (1_1)_1-st error to a (1_1) n-th error wherein the (1_1)_1-st error is acquired by referring to the (1_1)-st characteristic information and the (2_1)-st characteristic information and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is calculated by referring to the training data and the obfuscated training data.

23. A testing device for learning an obfuscation network used for concealing original data to protect personal information, comprising:

at least one memory that stores instructions; and at least one processor configured to execute the instructions to perform or support another device to perform processes of: (I) on condition that a learning device has performed processes of (i) acquiring and inputting training data into an obfuscation network and instructing the obfuscation network to obfuscate the training data and thus to generate obfuscated training data, (ii) inputting the obfuscated training data into a learning network having its own one or more learned parameters, and allowing the learning network to (ii-1) apply a network operation to the obfuscated training data using the learned parameters and thus to (ii-2) generate 1-st characteristic information corresponding to the obfuscated training data, and (iii) inputting the training data into the learning network, and allowing the learning network to (iii-1) apply a network operation to the training data using the learned parameters and thus to (iii-2) generate 2-nd characteristic information corresponding to the training data, and (iv) learning the obfuscation network including (iv-1) at least one 1-st error is minimized which is calculated by referring to at least part of (iv-1a) at least one (1_1)-st error acquired by referring to the 1-st characteristic information and the 2-nd characteristic information, and (iv-1b) at least one (1_2)-nd error acquired by referring to at least one task specific output generated by using the 1-st characteristic information and by further referring to at least one ground truth corresponding to the task specific output, and (iv-2) at least one 2-nd error is maximized which is calculated by referring to the training data and the obfuscated training data, performing a process of acquiring test data, and (II) inputting the test data into the obfuscation network and allowing the obfuscation network to obfuscate the test data using the learned parameters of the obfuscation network, to thereby output obfuscated test data as concealed test data, wherein, at the process of (I), the learning device (i) has acquired at least one obfuscated training data score as the 2-nd error which corresponds to the obfuscated training data inputted into a discriminator for determining whether inputted data is real or fake, (ii) has learned the obfuscation network including the 1-st error is minimized and that the 2-nd error is maximized, and (iii) has learned the discriminator including at least one modified training data score or at least one modified obfuscated training data score respectively corresponding to modified training data or modified obfuscated training data inputted into the discriminator is maximized and that the obfuscated training data score is minimized wherein the modified training data or the modified obfuscated training data is generated respectively by modifying the training data or the obfuscated training data.

24. The testing device of claim 23, wherein, at the process of (I), the learning network includes a 1-st learning network to an n-th learning network respectively having one or more 1-st learned parameters to one or more n-th learned parameters wherein n is an integer greater than 0, and wherein, the learning device has performed processes of (i) inputting the obfuscated training data into each of the 1-st learning network to the n-th learning network, and allowing each of the 1-st learning network to the n-th learning network to (i-1) apply its corresponding network operation to the obfuscated training data using respectively the 1-st learned parameters to the n-th learned parameters of the 1-st learning network to the n-th learning network, and thus to (i-2) output each piece of (1_1)-st characteristic information to (1_n)-th characteristic information on the obfuscated training data, and (ii) inputting the training data into each of the 1-st learning network to the n-th learning network, and allowing each of the 1-st learning network to the n-th learning network to (ii-1) apply its corresponding network operation to the training data using respectively the 1-st learned parameters to the n-th learned parameters of the 1-st learning network to the n-th learning network, and thus to (ii-2) output each piece of (2_1)-st characteristic information to (2_n)-th characteristic information on the training data, (iii) learning the obfuscation network including (iii-1) the 1-st error is minimized which is calculated by referring to at least part of (iii-1a) the (1_1)-st error which is an average over a (1_1)_1-st error to a (1_1)_n-th error wherein the (1_1)_1-st error is acquired by referring to the (1_1)-st characteristic information and the (2_1)-st characteristic information, and the (1_1)_n-th error is acquired by referring to the (1_n)-th characteristic information and the (2_n)-th characteristic information, and (iii-1b) the (1_2)-nd error which is an average over a (1_2)_1-st error to a (1_2)_n-th error wherein the (1_2)_1-st error is acquired by referring to at least one 1-st task specific output created by using the (1_1)-st characteristic information and by further referring to at least one 1-st ground truth corresponding to the 1-st task specific output, and the (1_2)_n-th error is acquired by referring to at least one n-th task specific output created by using the (1_n)-th characteristic information and by further referring to at least one n-th ground truth corresponding to the n-th task specific output, and (iii-2) the 2-nd error is maximized which is the modified training data score corresponding to the modified training data inputted into the discriminator, and (iv) learning the discriminator including the modified training data score or the modified obfuscated training data score is maximized which respectively corresponds to the modified training data or the modified obfuscated training data inputted into the discriminator, and that the modified training data score is minimized.

* * * * *